(12) United States Patent  (10) Patent No.: US 8,995,016 B2
Nakata et al.  (45) Date of Patent: Mar. 31, 2015

(54) PRINTING DEVICE CONFIGURED TO DETECT A CONFIGURATION OF DATA CONTROL UNITS DETACHABLY CONNECTED THERETO AND CONTROL METHOD THEREOF

(71) Applicants: Mitsutaka Nakata, Tokyo (JP); Masaki Masubuchi, Kanagawa (JP); Shunsuke Arita, Tokyo (JP); Satoko Fujiwara, Kanagawa (JP); Ato Araki, Tokyo (JE)

(72) Inventors: Mitsutaka Nakata, Tokyo (JP); Masaki Masubuchi, Kanagawa (JP); Shunsuke Arita, Tokyo (JP); Satoko Fujiwara, Kanagawa (JP); Ato Araki, Tokyo (JE)

(73) Assignee: Ricoh Company, Limited, Tokyo (JP)

( * ) Notice: Subject to any disclaimer, the term of this patent is extended or adjusted under 35 U.S.C. 154(b) by 34 days.

(21) Appl. No.: 13/746,439

(22) Filed: Jan. 22, 2013

(65) Prior Publication Data
US 2013/0188205 A1  Jul. 25, 2013

(30) Foreign Application Priority Data

Jan. 25, 2012 (JP) .................................. 2012-013529
Nov. 30, 2012 (JP) .................................. 2012-263359

(51) Int. Cl.
*G06K 15/02* (2006.01)
*G06K 15/00* (2006.01)

(52) U.S. Cl.
CPC ............ *G06K 15/02* (2013.01); *G06K 15/1894* (2013.01); *G06K 15/402* (2013.01); *G06K 15/1814* (2013.01)

USPC .............................. 358/1.9; 358/1.16; 347/43

(58) Field of Classification Search
None
See application file for complete search history.

(56) References Cited

U.S. PATENT DOCUMENTS

| 6,179,409 | B1 * | 1/2001 | Takahashi | ........................ 347/43 |
| 2008/0180470 | A1 | 7/2008 | Oku | |
| 2009/0268251 | A1 * | 10/2009 | Nishide | .......................... 358/2.1 |
| 2011/0228301 | A1 | 9/2011 | Fujiwara | |
| 2012/0019860 | A1 | 1/2012 | Fujiwara | |
| 2012/0069362 | A1 | 3/2012 | Konno | |
| 2012/0069402 | A1 | 3/2012 | Konno | |

FOREIGN PATENT DOCUMENTS

| JP | 2002-254763 | 9/2002 |
| JP | 2008-183884 | 8/2008 |
| JP | 2012-040867 | 3/2012 |

* cited by examiner

*Primary Examiner* — Steven Kau
*Assistant Examiner* — Andrew H Lam
(74) *Attorney, Agent, or Firm* — Harness, Dickey & Pierce, P.L.C.

(57) ABSTRACT

In a printer controller, an obtaining unit automatically obtains the configuration of each station. Based on the obtaining result of the obtaining unit, a table creating unit creates a table of setting information for each data control unit as well as creates a table of setting information for an image output control unit; and sends the table of the setting information for the data control unit to the data control units and sends the table of the settings information for the image output control unit to the image output control unit.

4 Claims, 21 Drawing Sheets

(TO IMAGE OUTPUT UNIT)

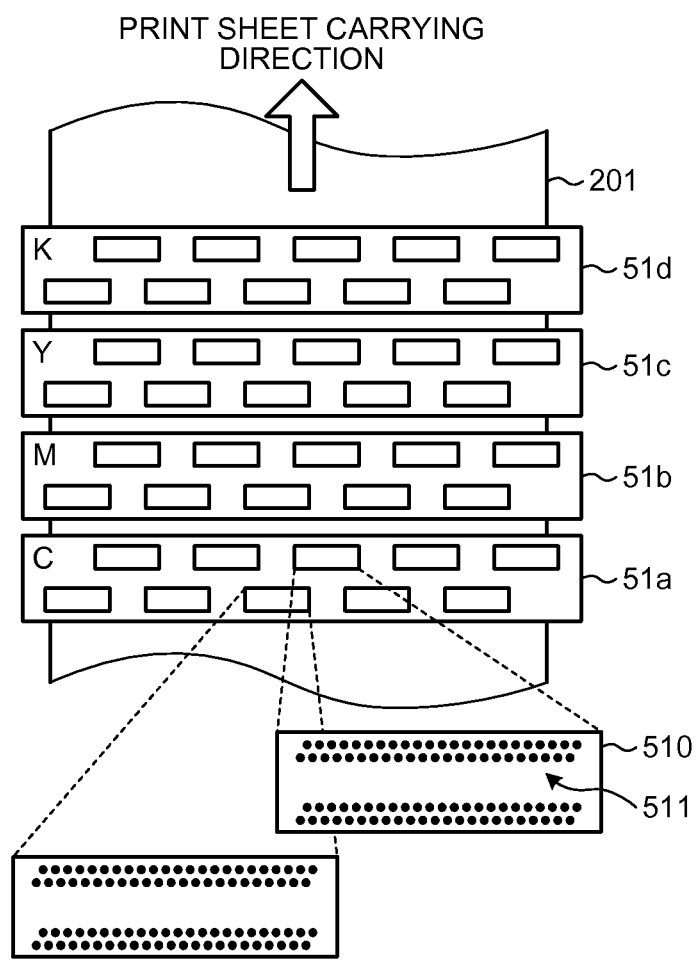

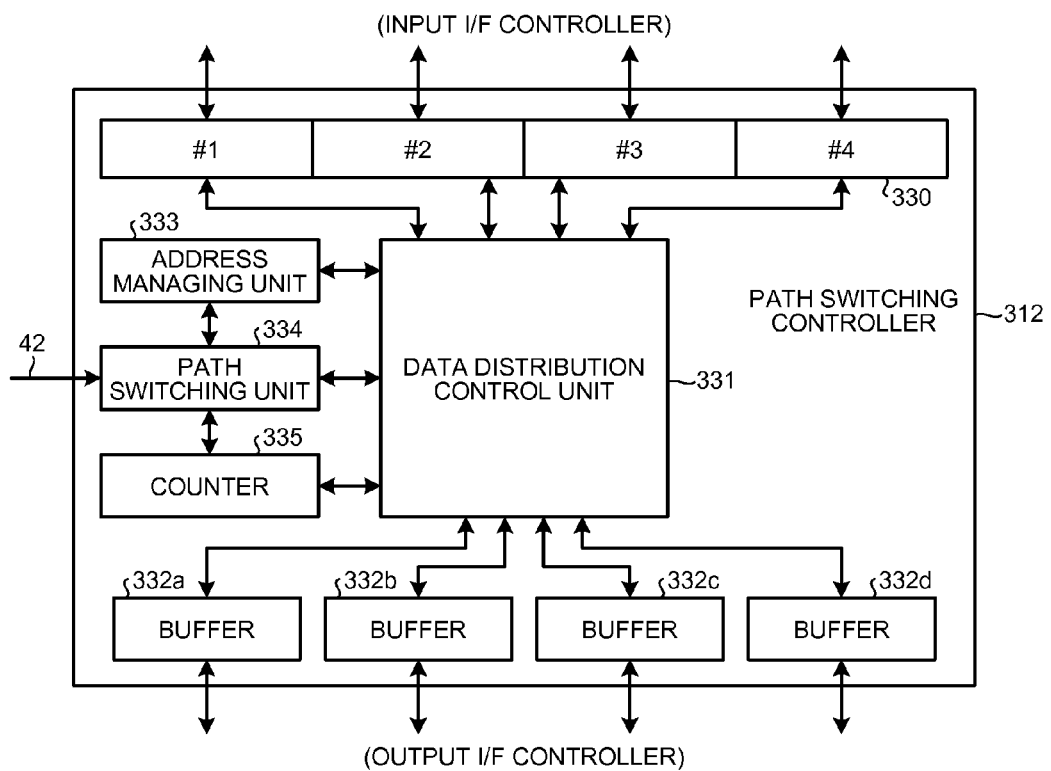
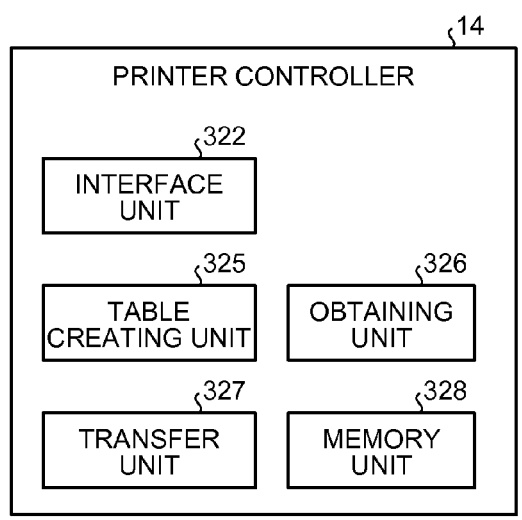

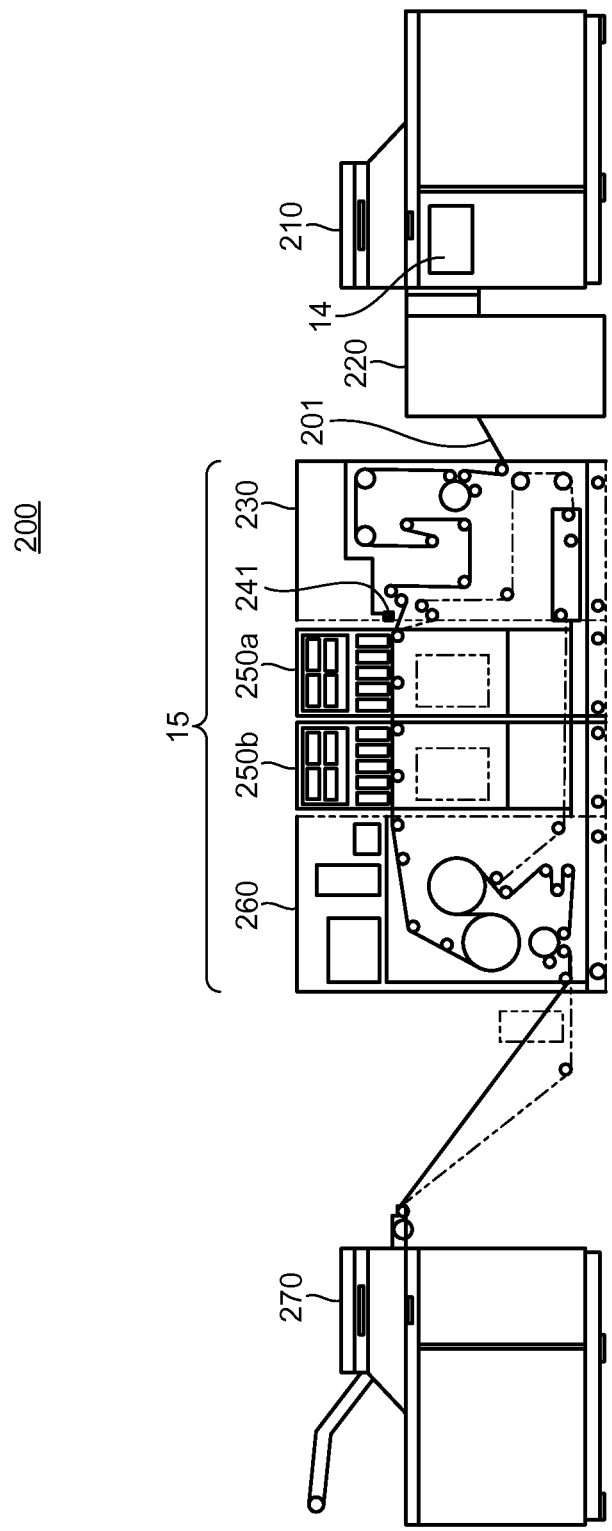

FIG.10

| ITEM NUMBER | DATA CONTROL UNIT | ITEM | CONTENTS |
|---|---|---|---|
| 1 | COMMON | NUMBER OF STATIONS | 1 |
| 2 | | STATION LOCATION NUMBER | 1 |
| 3 | | NUMBER OF DATA CONTROL UNITS PER STATION | 4 |
| 4 | 1 | COLOR FOR DATA CONTROL UNIT | C |
| 5 | 2 | COLOR FOR DATA CONTROL UNIT | M |
| 6 | 3 | COLOR FOR DATA CONTROL UNIT | Y |
| 7 | 4 | COLOR FOR DATA CONTROL UNIT | K |

FIG.11

| ITEM NUMBER | ITEM | SETTING VALUE |
|---|---|---|
| 1 | NUMBER OF I/F CONTROLLERS | 4 |
| 2 | STATION LOCATION NUMBER | 1 |
| 3 | COLOR INFORMATION (PRINTING UNIT #1) | C |
| 4 | COLOR INFORMATION (PRINTING UNIT #2) | M |
| 5 | COLOR INFORMATION (PRINTING UNIT #3) | Y |
| 6 | COLOR INFORMATION (PRINTING UNIT #4) | K |

FIG.15

| No | CLASSIFI-CATION | NAME | DIRECTION (DFE⇔PCTL) | CONTENTS |
|----|----|----|----|----|
| 1 | JOB INFOR-MATION | JOB START NOTICE | ⇔ | NOTIFICATION REGARDING STARTING OF JOB/REPLY TO NOTIFICATION COMMUNICATION OF JOB IDENTIFICATION (JOBID) |
| 2 | | JOB END NOTICE | ⇔ | NOTIFICATION REGARDING ENDING OF ALL PRINTING PROCESSES REQUESTED IN JOB/REPLY TO NOTIFICATION COMMUNICATION OF JOB IDENTIFICATION (JOBID) |
| 3 | PRINTER STATUS/ PRINTING PROCESS | PRINTING PROCESS RECEPTION START NOTIFICATION | ← | NOTIFICATION THAT PRINTER IS READY TO RECEIVE PRINTING PROCESS |
| 4 | | PRINTER INFORMATION REQUEST/NOTIFICATION | ⇔ | REQUEST FOR NECESSARY PRINTER INFORMATION/REPLY TO REQUEST |
| 5 | | PRINTING PROCESS START NOTIFICATION | ⇔ | NOTIFICATION THAT PRINT IMAGE DATA IS READY FOR USE/REPLY TO NOTIFICATION ACCORDING TO OUTPUT SEQUENCE, IN UNITS OF PAGES (PROCESS) |
| 6 | | PRINTING PROCESS REQUEST | ⇔ | NOTIFICATION REGARDING PRINTING PROCESS SENT FROM PRINTER CONTROLLER/ REPLY TO NOTIFICATION COLOR, PROCESS IDENTIFICATION NUMBER, PLANE IDENTIFICATION NUMBER REQUEST ON PLANE-BY-PLANE BASIS AND ACCORDING TO SEQUENCE OF REQUESTS FROM ENGINE ※BITMAP IS RETRIEVED BY ENGINE |
| 7 | | DATA TRANSFER COMPLETION NOTIFICATION | → | NOTIFICATION REGARDING COMPLETION OF TRANSFER OF REQUEST PLANE |
| 8 | | DATA RECEPTION COMPLETION NOTIFICATION | ← | NOTIFICATION REGARDING COMPLETION OF RECEPTION OF REQUEST PLANE |
| 9 | | PRINTING PROCESS COMPLETION NOTIFICATION | ← | NOTIFICATION REGARDING COMPLETION OF PRINT REQUESTS OF ALL PAGES (PROCESSES) |
| 10 | | PROCESS STATUS REPORT | ← | NOTIFICATION REGARDING PRINT STATUS OF PROCESSES ・PAPER FEEDING ・PAPER DISCHARGING ・STARTING OF PRINTING |
| 11 | | SC NOTIFICATION ERROR OCCURRENCE AND ELIMINATION NOTIFICATION | ⇔ ← | OBTAINING/NOTIFYING FAILURE INFORMATION OF PRINTER NOTIFICATION REGARDING OCCURRENCE OF ERROR IN HIGHER-LEVEL DEVICE AND ELIMINATION OF ERROR |
| 12 | PRINTING CONDI-TIONS | SETTINGS OF PRINTING CONDITIONS | ⇔ | NOTIFICATION REGARDING PRINTING CONDITIONS/REPLY TO NOTIFICATION ・PRINT STATUS (DUPLEX PRINTING/SINGLE-SIDE PRINTING) ・PRINTING TYPE (DATA AVAILABLE/BLANK SHEET) ・PAPER FEEDING/PAPER DISCHARGING INFORMATION (PAPER FEEDING SOURCE, PAPER DISCHARGING DESTINATION) ・PRINT SIDE SEQUENCE (FRONT/REAR/REARFRONT) ・PRINT SHEET SIZE ・PRINT DATA SIZE ・RESOLUTION, GRADATION ・COLOR INFORMATION  ETC. |
| 13 | CONNEC-TIONS | REGISTRATION/CANCELLATION | ⇔ | MUTUAL REGISTRATION/CANCELLATION OF HIGHER-LEVEL DEVICE AND PRINTER CONTROLLER |

FIG.18

| ITEM NUMBER | DATA CONTROL UNIT | ITEM | CONTENTS |
|---|---|---|---|
| 1 | COMMON | NUMBER OF STATIONS | 3 |
| 2 | | STATION LOCATION NUMBER | 1/2/3 |
| 3 | | NUMBER OF DATA CONTROL UNITS PER STATION | 2 |
| 4 | 1 | COLOR FOR DATA CONTROL UNIT | C |
| 5 | 2 | COLOR FOR DATA CONTROL UNIT | M |
| 6 | 3 | COLOR FOR DATA CONTROL UNIT | Y |
| 7 | 4 | COLOR FOR DATA CONTROL UNIT | K |
| 8 | 5 | COLOR FOR DATA CONTROL UNIT | SPOT COLOR #1 |
| 9 | 6 | COLOR FOR DATA CONTROL UNIT | SPOT COLOR #2 |

FIG.19A

| ITEM NUMBER | ITEM | SETTING VALUE |
|---|---|---|
| 1 | NUMBER OF I/F CONTROLLERS | 2 |
| 2 | STATION LOCATION NUMBER | 1 |
| 3 | COLOR INFORMATION (PRINTING UNIT #1) | C |
| 4 | COLOR INFORMATION (PRINTING UNIT #2) | C |
| 5 | COLOR INFORMATION (PRINTING UNIT #3) | M |
| 6 | COLOR INFORMATION (PRINTING UNIT #4) | M |

FIG.19B

| ITEM NUMBER | ITEM | SETTING VALUE |
|---|---|---|
| 1 | NUMBER OF I/F CONTROLLERS | 2 |
| 2 | STATION LOCATION NUMBER | 2 |
| 3 | COLOR INFORMATION (PRINTING UNIT #1) | Y |
| 4 | COLOR INFORMATION (PRINTING UNIT #2) | Y |
| 5 | COLOR INFORMATION (PRINTING UNIT #3) | K |
| 6 | COLOR INFORMATION (PRINTING UNIT #4) | K |

FIG.19C

| ITEM NUMBER | ITEM | SETTING VALUE |
|---|---|---|
| 1 | NUMBER OF I/F CONTROLLERS | 2 |
| 2 | STATION LOCATION NUMBER | 3 |
| 3 | COLOR INFORMATION (PRINTING UNIT #1) | SPOT COLOR #1 |
| 4 | COLOR INFORMATION (PRINTING UNIT #2) | SPOT COLOR #1 |
| 5 | COLOR INFORMATION (PRINTING UNIT #3) | SPOT COLOR #2 |
| 6 | COLOR INFORMATION (PRINTING UNIT #4) | SPOT COLOR #2 |

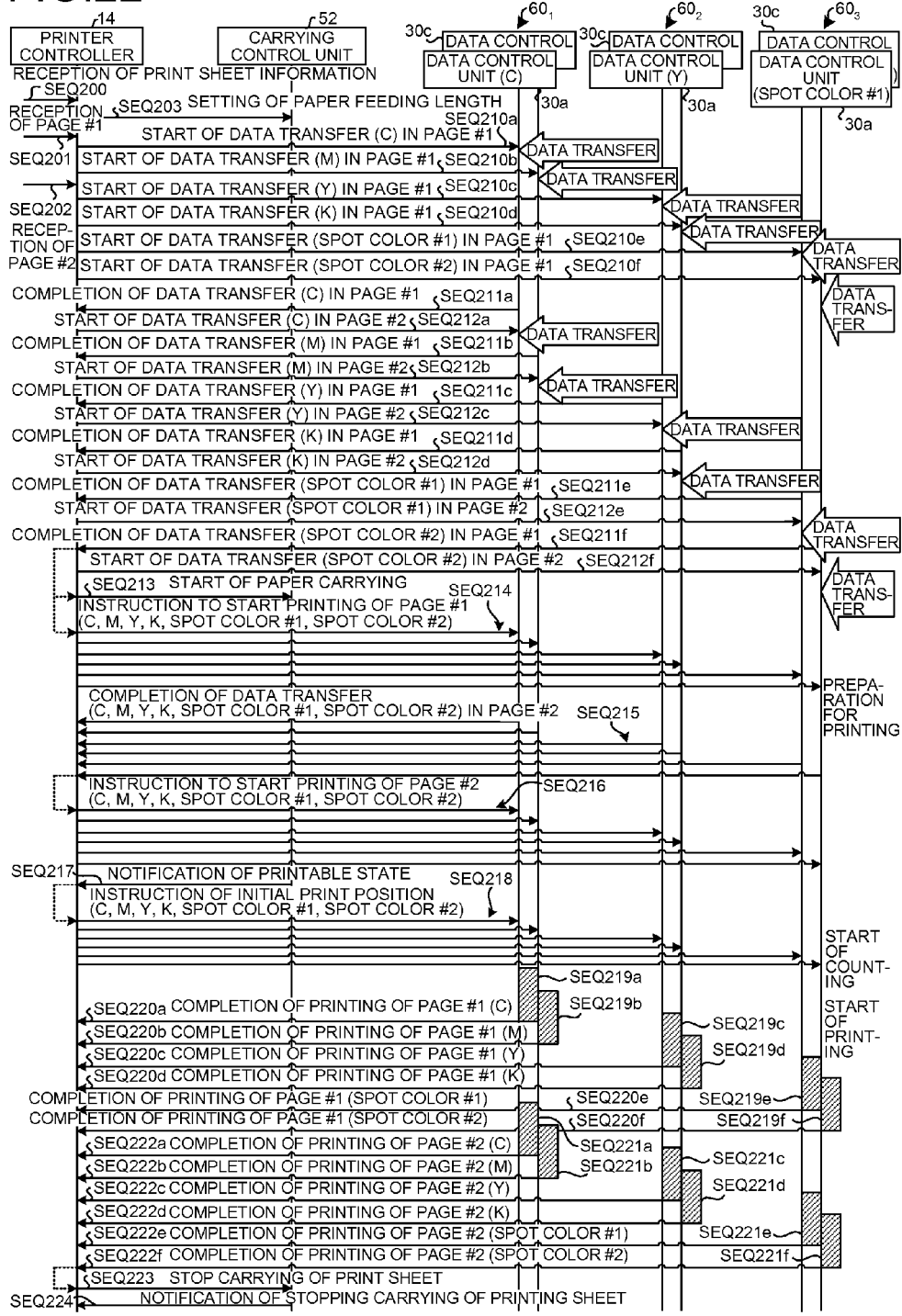

PRINTING DEVICE CONFIGURED TO DETECT A CONFIGURATION OF DATA CONTROL UNITS DETACHABLY CONNECTED THERETO AND CONTROL METHOD THEREOF

CROSS-REFERENCE TO RELATED APPLICATIONS

The present application claims priority to and incorporates by reference the entire contents of Japanese Patent Application No. 2012-013529 filed in Japan on Jan. 25, 2012 and Japanese Patent Application No. 2012-263359 filed in Japan on Nov. 30, 2012.

BACKGROUND OF THE INVENTION

1. Field of the Invention

The present invention relates to a printing device, which performs printing according to print image data that is received from a higher-level device, and to a control method of the printing device.

2. Description of the Related Art

Typically, a printing system is known in which a host device issues a print request that is received by a higher-level device which is disposed separately from a printing device. Then, the higher-level device generates print image data according to the received print request, and sends that print data to the printing device via a data transfer path. Subsequently, the printing device prints the print image data.

Meanwhile, a print control device that controls printing performed by a printing device needs to ensure that printing is performed at a timing suitable for the printing process. For that reason, in the abovementioned printing system in which the print image data that is received from the higher-level device is printed; a technology is already known by which the print image data received from the higher-level device is buffered in the memory of a printer engine, and data control units sequentially read the target print image data for printing from that memory and transfer it to printing units.

In Japanese Patent Application Laid-open No. 2008-183884 is disclosed a printing system that includes data control units which rearrange image data on an ink-discharge basis with the aim of speeding up the data transfer. More specifically, in Japanese Patent Application Laid-open No. 2008-183884, the image data that is transferred from a host device to a printer controller is rearranged by the data control units on an ink-discharge basis in concert with the nozzle arrangement of a matrix print head of the ink-jet type. As a result, during printing, it becomes possible to perform memory control and data transfer in an expeditious manner.

Meanwhile, regarding full-color printing, it is common practice to make use of four colors of cyan (C), magenta (M), yellow (Y), and black (K) that are called process colors. On the other hand, a technology is already known for enabling additional printing with respect to the printing that has been performed using the process colors. In such additional printing, colors such as bright red and bright orange that are difficult to express using only the process colors, or transparent colors (clear toners) are used as spot colors. The use of spot colors makes it possible to provide printed images having higher image quality.

However, by implementing the conventional data transfer method in which data control units transfer print image data, which is read from a memory, directly to printing units; the following issue arises. In a single printing system, it is difficult to keep on changing the combination of the data control units and the printing units in order to perform printing in particular colors.

For example, consider a case when, in a printing system in which printing of process colors is performed by implementing the abovementioned data transfer method, a configuration is newly added to enable printing of spot colors. In this case, in order to be able to perform printing of process colors as well as spot colors, the printing system needs to be separately designed depending on the combination of the data control units and the printing units. That results in an increase in the manufacturing cost.

Meanwhile, in Japanese Patent Application Laid-open No. 2008-183884, the print image data is transferred to the printing units according to a suitable order for printing. However, in Japanese Patent Application Laid-open No. 2008-183884, the configuration is such that data equivalent to a single line stored in a line memory is rearranged to fit in a two-dimensional matric print head. Thus, in case there is a change in the combination of the data control units and the printing units, then there is no resolution of the issue that the printing system needs to be separately designed depending on the combination of the data control units and the printing units.

Therefore, there is a need for a printing system, in which a higher-level device transfers print image data to a printing device, enabling to deal with different variations.

SUMMARY OF THE INVENTION

According to an embodiment, there is provided a printing device that includes a printing execution unit, a data control unit, and a printing control unit. The printing execution unit includes an input unit that receives input of image data; a printing unit that performs printing according to the image data received as input by the input unit; and a selecting unit that, according to path setting information, selects a path for providing the image data, which is received as input by the input unit, to the printing unit. The data control unit is detachably connected to the input unit and includes a holding unit that holds image data transferred from a higher-level device; and a transfer control unit that controls transfer of the image data from the higher-level device to the holding unit via a first transfer path and controls sending of the image data held in the holding unit to the input unit. The printing control unit, according to control information transferred from the higher-level device via a second transfer path, controls printing of the image data performed by the printing execution unit. The printing control unit detects the data control unit connected to the input unit, generates, according to detection result, the path setting information which contains information regarding the path for image data that is held in the holding unit of the detected data control unit, and sends the path setting information to the selecting unit.

According to another embodiment, there is provided a control method of a printing device. The control method includes performing, by a printing unit, printing according to image data received as input from an input unit; selecting, by a selecting unit, according to path setting information, a path for providing the image data, which is received as input by the input unit, to the printing unit; holding, by a holding unit, image data transferred from a higher-level device; controlling, by a transfer control unit, transfer of the image data from the higher-level device to the holding unit via a first transfer path and controlling sending of the image data held in the holding unit to the input unit; and controlling, by a printing control unit, printing of the image data, which is performed at the printing and the selecting, according to control information transferred from the higher-level device via a second transfer path. The controlling the printing of the image data includes detecting the transfer control unit connected to the input unit, generating, according to detection result, the path setting information which contains information regarding the path for image data that is held in the holding unit corresponding to the detected transfer control unit, and sending the path setting information to the selecting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an outlined line drawing illustrating an exemplary head configuration in each printing unit according to the embodiment;

FIG. 7 is a block diagram illustrating in detail an exemplary configuration of a path switching controller according to the embodiment;

FIG. 8 is an exemplary functional block diagram for explaining the functions of a printer controller according to the embodiment;

FIG. 9A is an outlined line drawing schematically illustrating an exemplary structure of a printer device that includes a printing medium carrying system and that is applicable to the embodiment;

FIG. 10 is an outlined line drawing illustrating a table in which setting information for data control unit, which is applicable to a first configuration according to the embodiment, is stored;

FIG. 11 is an outlined line drawing illustrating a table in which setting information for image output control unit, which is applicable to a first configuration according to the embodiment, is stored;

FIG. 15 is an outlined line drawing illustrating an example of control information that is communicated between the higher-level device and the printer controller of the printer device via a control line according to the embodiment;

FIG. 18 is an outlined line drawing illustrating an example of a table of setting information for data control unit in the second configuration according to the embodiment;

FIGS. 19A to 19C are outlined line drawings illustrating examples of a table of setting information for image output control unit in the second configuration according to the embodiment;

FIG. 22 is a sequence diagram for explaining, on a conceptual basis, an exemplary printing operation performed in the second configuration according to the embodiment.

DETAILED DESCRIPTION OF THE PREFERRED EMBODIMENTS

An exemplary embodiment of a printing device and a control method of the printing device is described in detail below with reference to the accompanying drawings. Firstly, in order to facilitate understanding, the explanation is given about an outline of production printing in which a printing system according to the embodiment is implemented. The basic idea of production printing is to perform a large volume of printing in a short period of time. Therefore, in production printing, in order to speed up the printing as well as to perform print job management and print data management in an efficient manner, a workflow system is built that performs the tasks starting from creating print data to distributing printed materials.

In the workflow of production printing, the printing system according to the embodiment is involved in the task of printing. On the other hand, RIP processing (RIP stands for Raster Image Processor) and printing of bitmap data, which is obtained as a result of RIP processing, is performed using a separate device. During a printing process, RIP processing requires the maximum amount of processing time. Hence, by separating off the device for performing RIP processing from the device for performing the printing process, it becomes possible to speed up the printing.

Overview of Printing System Implementable in Embodiment

Figure 1:
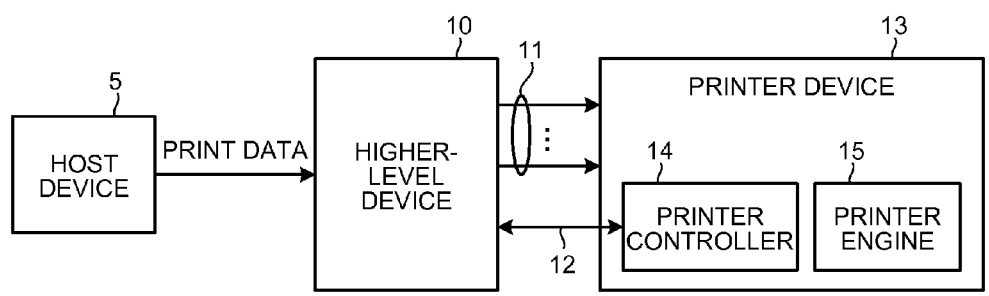
FIG. 1 is a block diagram illustrating an exemplary printing system that is applicable to an embodiment of the present invention.

FIG. 1 is a block diagram illustrating an exemplary printing system that is applicable to the embodiment of the present invention. In the printing system; a higher-level device 10 and a printer device 13, which functions as an image forming apparatus, are connected by a plurality of data lines 11 and a control line 12. Moreover, in the printing system; a host device 5 is, for example, a computer that generates print job data containing print image data and printing setting information.

The print job data contains, for example, data that is written in a page description language (PDL) (hereinafter, referred to as "PDL data"). That PDL data is interpreted so as to generate the print image data, which contains bitmap images to be printed; and to generate the printing setting information, which contains information related to the printing settings such as page information during printing, layout information during printing, and print copies.

The higher-level device 10 performs RIP processing according to the print job data received from the host device 5, and generates the print image data in the form of bitmap data of each color. In addition, based on the print job data or based on the information received from the host device 5, the higher-level device 10 creates control information that is used in controlling the printing operation.

The print image data of respective colors that is created by the higher-level device 10 is then sent to a printer engine 15, which is disposed in the printer device 13, via the data lines 11. Moreover, control information that is used in controlling the printing operation is communicated between the higher-level device 10 and a printer controller 14 via the control line 12. Based on the communication of the control information, the printer controller 14 controls the printer engine 15 so that printing is performed in accordance with a print job and images are formed on a printing medium.

Herein, there is no restriction on implementing any particular printing method. In the embodiment, print sheets are used as the recording medium, and the ink-jet method is implemented to form images on the print sheets. However, that is not the only possible case. Alternatively, the embodiment can also be applied to a printing device in which images are formed on print sheets using toners.

As the print sheets, it is possible to use a continuous sheet (continuous stationery) perforated at predetermined intervals to enable cutting into sheets, or it is possible to use cut sheets of a predetermined size (such as the A4 size or the B4 size). As far as a continuous sheet is concerned, pages point to the areas sandwiched between perforations formed at predetermined intervals. As far as a cut sheets are concerned, one side of a single print sheet is assumed to be a single page.

Meanwhile, in the printing system according to the embodiment, the target recording medium for printing is not limited to print sheets made of paper. Alternatively, any other printing medium can be used as long as printing on that printing medium can be performed by implementing the printing method according to the embodiment and as long as that printing medium can be provided as a roll. For example, as the printing medium, it is possible to use plastic film or a printing cloth.

Higher-Level Device

Figure 2A:
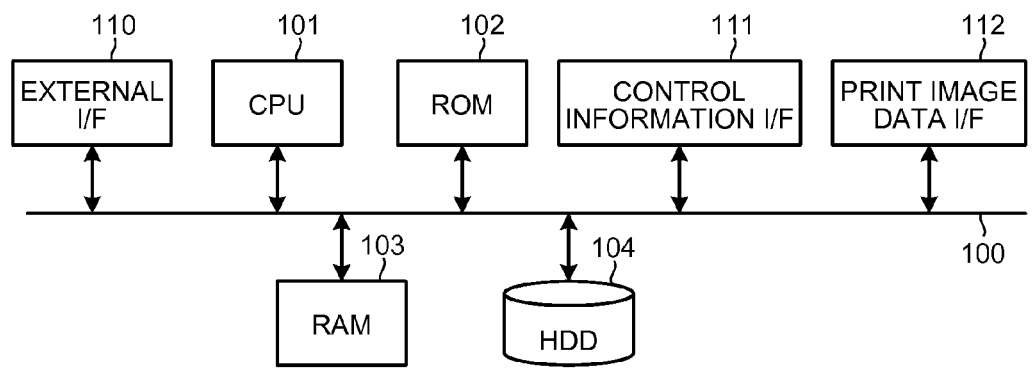
FIG. 2A is a block diagram illustrating an exemplary configuration of a higher-level device according to the embodiment.

FIG. 2A is a block diagram illustrating an exemplary configuration of the higher-level device 10. In the higher-level device 10 illustrated in FIG. 2A; a central processing unit (CPU) 101, a read only memory (ROM) 102, a random access memory (RAM) 103, and a hard disk drive (HDD) 104 are connected to a bus 100. In addition, an external I/F 110, a control information I/F 111, and a print image data I/F 112 are also connected to the bus 100. Thus, the constituent elements connected to the bus 100 can communicate with each other via the bus 100.

The ROM 102 and the HDD 104 are used to store in advance the computer programs that the CPU 101 requires to perform operations. The RAM 103 is used as the work memory of the CPU 101. Thus, the CPU 101 follows instructions given in the computer programs that are stored in the ROM 102 and the HDD 104, and controls the overall operations of the higher-level device 10 while using the RAM 103 as the work memory.

The external I/F 110 is compatible to, for example, TCP/IP (which stands for Transmission Control Protocol/Internet Protocol), and controls the communication performed with the host device 5. The control information I/F 111 controls the communication of control information. The print image data I/F 112 controls the communication of print image data, and has a plurality of channels. For example, the print image data of yellow (Y), cyan (C), magenta (M), and black (B) colors that is created in the higher-level device 10 is output from the channels of the print image data I/F 112. Since the print image data I/F 112 needs to have a high transfer speed; for example, the PCI Express standard is used (PCI Express stands for Peripheral Component Interconnect Bus Express). Although there is no restriction on the bus standard used for the control information I/F 111, the PCI Express standard is used in an identical manner to the print image data I/F 112.

In this configuration, the print job data sent by the host device 5 is received by the higher-level device 10 at the external I/F 110 and is then stored in the HDD 104 via the CPU 101. Subsequently, the CPU 101 reads the print job data from the HDD 104, performs RIP processing according to the print job data, generates bitmap data of each color, and writes each set of bitmap data in the RAM 103. For example, the CPU 101 performs RIP processing to render the PDL data, generates bitmap data of each color, and writes each set of bitmap data in the RAM 103. Then, the CPU 101 performs compression coding of the bitmap data of each color that is written in the RAM 103, and temporarily stores the compression-coded bitmap data in the HDD 104.

For example, at the time of starting a printing operation in the printer device 13; the CPU 101 reads the compression-coded bitmap data of each color from the HDD 104, decodes the compression coding, and writes the expanded bitmap data of each color in the RAM 103. Then, the CPU 101 reads the bitmap data of each color from the RAM 103, and outputs the bitmap data of each color as the print image data of each color to the printer device 13 from the channels of the print image data I/F 112. Moreover, depending on the progress of the printing operation, the CPU 101 communicates the control information, which is used in controlling the printing operation, with the printer device 13 via the control information I/F 111.

Figure 2B:
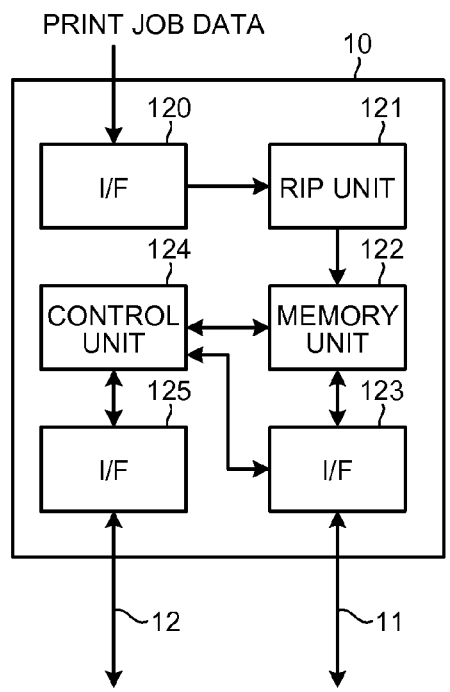
FIG. 2B is an exemplary functional block diagram for explaining the functions of the higher-level device according to the embodiment.

FIG. 2B is an exemplary functional block diagram for explaining the functions of the higher-level device 10. Herein, the higher-level device 10 includes interfaces (I/Fs) 120, 123, and 125; an RIP unit 121, a memory unit 122, and a control unit 124. The interfaces 120, 123, and 125 respectively correspond to the external I/F 110, the print image data I/F 112, and the control information I/F 111. The RIP unit 121 and the control unit 124 are configured by the computer programs running in the CPU 101 illustrated in FIG. 2A. The memory unit 122 corresponds to at least one of the RAM 103 and the HDD 104 illustrated in FIG. 2A.

The print job data that contains PDL data is created in the host device 5 and is sent to the higher-level device 10. Thereat, the print job data is received at the interface 120 and provided to the RIP unit 121. Based on the PDL data included in the print job data, the RIP unit 121 performs rendering and generates print image data containing bitmap data of each of cyan (C), magenta (M), yellow (Y), and black (K) colors. Then, the RIP unit 121 sequentially stores the print image data of each of the cyan (C) color, the magenta (M) color, the yellow (Y) color, and the black (K) color in the memory unit 122.

The control unit 124 communicates with the printer controller 14 of the printer device 13 via the interface 125. For example, based on the print job data received from the host device 5 via the interface 120, the control unit 124 generates control information that is used in controlling the printing performed by the printer device 13. Then, the control unit 124 sends the control information to the printer controller 14 via the interface 125.

The control information that is used in controlling the printing contains, for example, information related to the print image data and information related to the printing medium (print sheets) on which the print image data is to be printed. The information related to the print image data contains the resolution of printed images, gradation information, information related to the print size, and the number of pages. The information related to the print sheets contains information indicating whether a continuous sheet is used or cut sheets are used and contains information related to paper carrying. Herein, the information related to paper carrying contains, for example, the paper feeding length (number of dots), information indicating the paper feeding tray and the catch tray, and information indicating the paper size.

The interface 123 is configured to be able to independently access the print image data of each of the cyan (C) color, the magenta (M) color, the yellow (Y) color, and the black (K) color stored in the memory unit 122. Moreover, the interface 123 is connected to the printer device 13 via the data lines 11 that correspond to each of cyan (C), magenta (M), yellow (Y), and black (K) colors. Thus, to the printer device 13, the interface 123 communicates control information related to the transfer of print image data of each of the cyan (C) color, the magenta (M) color, the yellow (Y) color, and the black (K) color; as well as transfers the print image data of each of the cyan (C) color, the magenta (M) color, the yellow (Y) color, and the black (K) color via the data lines 11.

The embodiment will be explained below in detail. Herein, in the printer engine 15 of the printer device 13, the constituent unit that performs printing is called station. Thus, the printer engine 15 includes the station and a carrying control unit that carries the printing medium. In the embodiment, the printer engine 15 can have one or more stations having the same configuration, and each such station is controlled by the printer controller 14 disposed in common.

First Configuration

Figure 3:
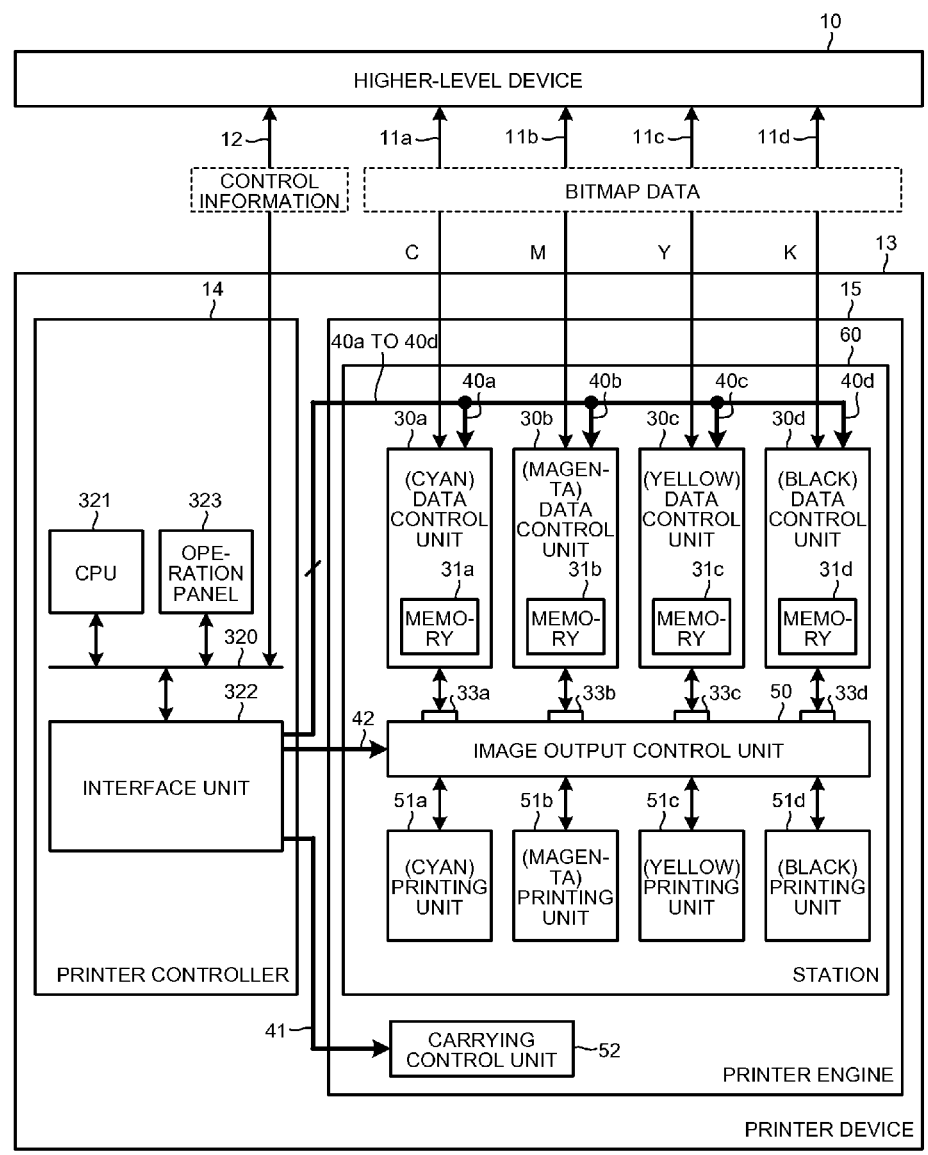
FIG. 3 is a block diagram illustrating a first configuration, which is the minimum configuration, of a printer device according to the embodiment.

FIG. 3 is a block diagram illustrating a first configuration of the printer device 13 according to the embodiment for the purpose of performing printing using process colors, that is, printing with each of cyan (C), magenta (M), yellow (Y), and black (K) colors. The printer controller 14 is connected to the control line 12, and controls the printing operation by communicating the control information with the higher-level device 10 via the control line 12. The printer engine 15 is connected to a plurality of data lines 11a, 11b, 11c, and 11d. Moreover, under the control of the printer controller 14, the printer engine 15 performs a printing process using the print image data (bitmap data) of each color received from the higher-level device 10 via the data lines 11a, 11b, 11c, and 11d.

Given below is the detailed explanation regarding the printer controller 14 and the printer engine 15. The printer controller 14 includes a CPU 321, an interface (I/F) unit 322, and an operation panel 323. Moreover, the CPU 321, the interface unit 322, and the operation panel 323 are interconnected via a bus 320 in a communicable manner. To the bus 320 is also connected the control line 12 via a communication I/F (not illustrated).

The CPU 321 follows instructions written in a computer program that is stored in a ROM (not illustrated), accordingly performs operations using a RAM (not illustrated) as the work memory, and controls the overall operations of the printer device 13. The interface unit 322 is configured with, for example, an application specific integrated circuit (ASIC) in which a microprocessor and a plurality of direct memory access controllers (DMACs) are interconnected in a communicable manner.

The interface unit 322 is connected to data control units 30a, 30b, 30c, and 30d (described later) via engine I/F control lines 40a, 40b, 40c, and 40d, respectively. The interface unit 322 separately performs communication of control signals with each of the data control units 30a to 30d.

The interface unit 322 is connected to a carrying control unit 52 and a carrying control line 41, and communicates control signals for controlling paper carrying with the carrying control unit 52. Moreover, the interface unit 322 is connected to an image output control unit 50 via a communication line 42. With that, the interface unit 322 communicates with the image output control unit 50 via the communication line 42; and, for example, obtains the information regarding the data control units 30a, 30b, 30c, and 30d that are mounted on the image output control unit 50.

The CPU 321 analyzes the control information that is received from the higher-level device 10 via the control line 12, and performs settings with respect to the interface unit 322 according to the analysis result. For example, the CPU 321 writes parameters according to the analysis result in a register of the interface unit 322 to thereby perform settings with respect to the interface unit 322. Then, according to the settings performed by the CPU 321, the interface unit 322 performs control with respect to hardware components such as the data control units 30a to 30d; the image output control unit 50; and the carrying control unit 52.

In the printer device 13 that performs printing of process colors, the printer engine 15 includes a single station 60 for printing images on print sheets according to the print image data and includes the carrying control unit 52 for controlling the carrying of the print sheets. The station 60 includes the image output control unit 50 and includes printing units 51a, 51b, 51c, and 51d. To the image output control unit 50; the data control units 30a, 30b, 30c, and 30d are detachably attached via connecting units 33a, 33b, 33c, and 33d, respectively. The data control units 30a, 30b, 30c, and 30d respectively include memories 31a, 31b, 31c, and 31d each having the same memory capacity and the same address configuration.

Although described later in detail, the data control units 30a to 30d control the transfer of the print image data from the higher-level device 10 as well as control the transfer of the print image data, which has been transferred from the higher-level device 10, to the printing units 51a to 51d, respectively. Meanwhile, each of the data control units 30a to 30d has the same configuration. For that reason, in the following explanation, unless there is a need to distinguish among the data control units 30a, 30b, 30c, and 30d; the explanation is given with reference to the representative data control units 30. In a similar manner, unless there is a need to distinguish among the memories 31a, 31b, 31c, and 31d; the following explanation is given with reference to the representative memories 31.

Each memory 31 preferably has the memory capacity for storing the print image data worth at least three pages. Herein, the print image data worth three pages points to the print image data of the page that is being transferred from the higher-level device 10, the print image data of the page that is being output at present, and the print image data of the next page. However, that is not the only possible case. That is, alternatively, memories 31 can have the memory capacity for storing the print image data worth two or fewer pages.

The memories 31 are batch-controlled by the printer controller 14 using an input pointer and an output pointer. The input pointer indicates the beginning address in the case of transferring the print image data to the memories 31; while the output pointer indicates the beginning address in the case of outputting the print image data from the memories 31.

Figure 4A:
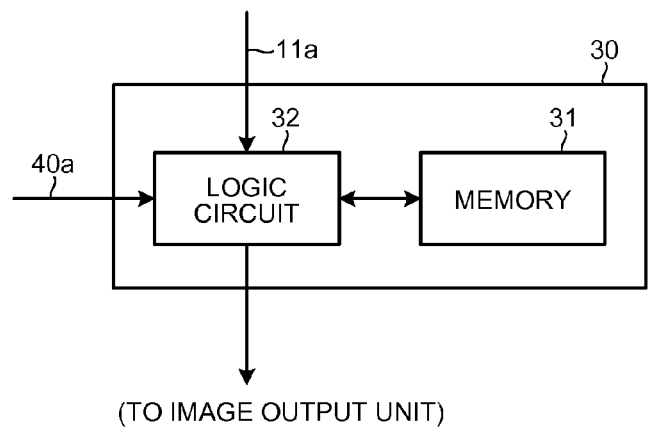
FIG. 4A is a block diagram schematically illustrating an exemplary configuration of a data control unit according to the embodiment.

FIG. 4A is a block diagram schematically illustrating an exemplary configuration of the data control units 30. Herein, each data control unit 30 includes the memory 31 and a logic circuit 32. To the logic circuit 32 is connected one of the engine I/F control lines 40a to 40d (herein, it is assumed that the engine I/F control line 40a is connected). Moreover, to the logic circuit 32 is connected one of the data lines 11a to 11d (herein, it is assumed that the data line 11a is connected). The logic circuit 32 follows a control signal that is received from the printer controller 14 via the engine I/F control line 40a; and stores in the memory 31 the print image data that has been transferred from the higher-level device 10 via the data line 11a. In an identical manner, the logic circuit 32 follows a control signal or setting information for data control unit that is received from the printer controller 14 via the engine I/F control line 40a; reads the print image data from the memory 31; and sends that print image data to the image output control unit 50 (described later).

Meanwhile, as compared to the control performed using a CPU in which operations are branched by means of interrupts with respect to a computer program; the control performed by the logic circuit 32, which is configured as a hardware component using a combination of logic circuits, has the advantage that the processing can be performed at a higher speed. For example, the logic circuit 32 performs logical determination with respect to the control signal or the setting information for the data control unit received in the form of a bit sequence via the engine I/F control line 40a, and determines the operations to be performed. However, that is not the only possible case. Alternatively, the functions equivalent to the functions of the logic circuit 32 can be implemented as software with the use of a CPU.

The print image data that is output from the data control units 30 is sent to the image output control unit 50. Then, the image output control unit 50 performs printing of the print image data of each color. Herein, in the embodiment, the printing of the print image data is performed by implementing the ink-jet method in which a jet of ink is discharged from a nozzle formed on the print head. Of course, the printing method is not limited to the ink-jet method; and it is also possible implement, for example, the laser printing method.

Figure 4B:
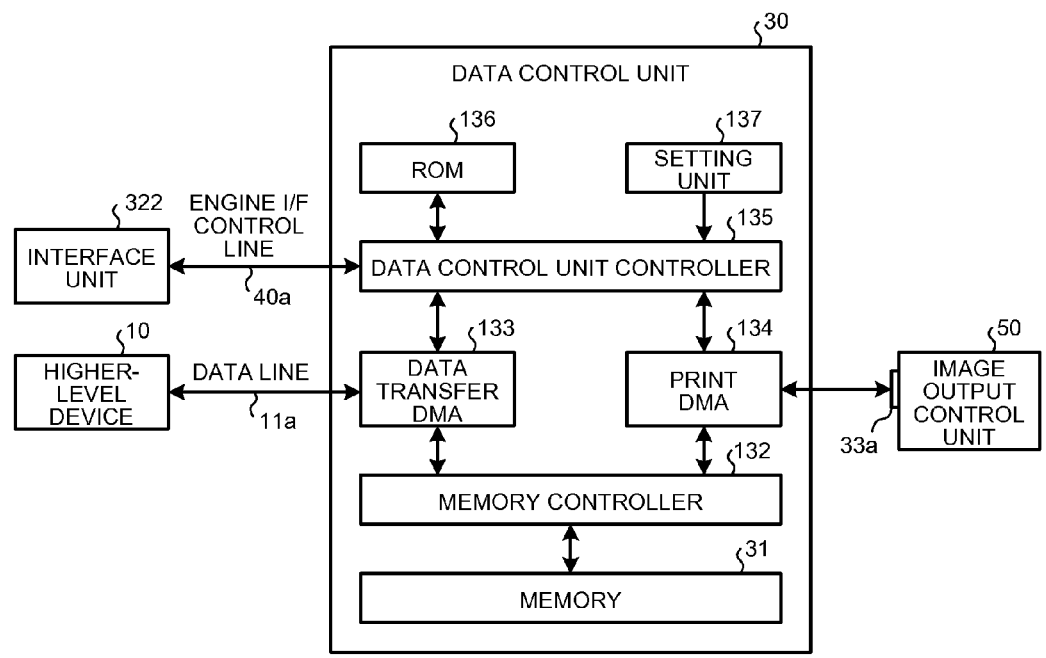
FIG. 4B is a block diagram illustrating the exemplary configuration of the data control unit according to the embodiment in a more detailed manner.

FIG. 4B is a block diagram illustrating the exemplary configuration of the data control units 30 in a more detailed manner. In FIG. 4B, the constituent elements identical to the constituent elements illustrated in FIG. 4A are referred to by the same reference numerals, and the detailed explanation thereof is not repeated. Herein, each data control unit 30 includes the memory 31, a memory controller 132, a data transfer DMA 133 (DMA stands for Direct Memory Access), a print DMA 134, a data control unit controller 135, a ROM 136, and a setting unit 137. Of those constituent elements; the memory controller 132, the data transfer DMA 133, the print DMA 134, and the data control unit controller 135 are disposed in the logic circuit 32 illustrated in FIG. 4A.

The memory controller 132 controls the access with respect to the memories 31. The data transfer DMA 133 receives the print image data from the higher-level device 10, and writes that print image data in the memories 31 via the memory controller 132. The print DMA 134 reads data from the memories 31 via the memory controller 132, and transfers the read data to the image output control unit 50. The data control unit controller 135 receives control information or setting information for data control unit that is sent from the interface unit 322 of the printer controller 14 via, for example, the engine I/F control line 40a; and controls the data transfer DMA and the print DMA 134 according to the control information or the setting information for the data control unit that is received.

For example, when the data control unit controller 135 receives a data transfer start request, which is issued from the printer controller 14, via the engine I/F control line 40a; the data control unit controller 135 accordingly instructs the data transfer DMA 133 to start the data transfer. Upon receiving the instruction, the data transfer DMA 133 sends a data transfer request to the higher-level device 10 via, for example, the data line 11a. Then, for example, the data transfer DMA 133 receives the data sent by the higher-level device 10 in response to the data transfer request and writes that data at a predetermined address in one of the memories 31 via the memory controller 132.

Moreover, when the data control unit controller 135 receives a print instruction, which is issued from the printer controller 14, via, for example, the engine I/F control line 40a; the data control unit controller 135 instructs the print DMA 134 to read data from the memories 31. In response to the instruction, the print DMA 134 reads data from the memories 31 via the memory controller 132. Then, the print DMA 134 transfers the read data to the image output control unit 50.

The setting unit 137 sets identification information that is used identifying the data control units 30. For example, the identification information is used in identifying each data control unit 30 in a single station 60. For example, a dual in-line package (DIP) switch can be used as the setting unit 137, and the settings regarding that DIP switch can be used as the identification information. Meanwhile, either the identification information can be stored in advance in the ROM 136, or the setting unit 137 can be configured to store the identification information set therein in the ROM 136.

Returning to the explanation with reference to FIG. 3, the image output control unit 50 controls the transfer of print image data, which is output from one or more data control units 30, to the printing units 51a, 51b, 51c, and 51d. Each of the printing units 51a to 51d includes a printing ink of a specified color, a head for discharging that printing ink, and a driving unit for driving the head. Thus, each of the printing units 51a to 51d performs image formation by outputting images based on the print image data onto print sheets. Regarding the configuration for performing printing of process colors; the printing units 51a, 51b, 51c, and 51d discharge printing inks of, for example, cyan (C) color, magenta (M) color, yellow (Y) color, and black (K) color, respectively.

Each of the printing units 51a to 51d can independently output color identification information that indicates the color of the ink discharged by that particular printing unit. For example, each of the printing units 51a to 51d includes a ROM in which color identification information is stored in advance, and outputs that color identification information in response to a request from the image output control unit 50. However, that is not the only possible case. Alternatively, each of the printing units 51a to 51d can output the corresponding color identification information by making use of the pin arrangement in a connecting unit that establishes a connection with the image output control unit 50.

FIG. 5 is an outlined line drawing illustrating an exemplary head configuration in each of the printing units 51a to 51d. Taking the printing unit 51a as an example, a head unit includes nozzle blocks 510 each having nozzle arrays 511 made of a number of nozzles arranged at a predetermined pitch for discharging the printing ink. The nozzle blocks 510 are arranged in a zigzag manner with respect to the width direction of a print sheet 201. Moreover, each nozzle block 510 is so arranged in the head unit that the ends of the nozzle arrays 511 in adjacent nozzle blocks 510 overlap with each other with respect to the direction of movement of the print sheet 201. Meanwhile, the head configuration of each of the printing units 51b, 51c, and 51d is identical to the head configuration of the printing unit 51a.

In the example illustrated in FIG. 5; the printing units 51a, 51b, 51c, and 51d are arranged in that particular order with respect to the direction of movement of the print sheet 201. Thus, the printing with respect to the print sheet 201 is performed by the printing units 51a, 51b, 51c, and 51d in that order.

In this example, to the image output control unit 50 are connected four data control units 30a, 30b, 30c, and 30d. Moreover, to the four data control units 30a, 30b, 30c, and 30d are connected the data lines 11a, 11b, 11c, and 11d, respectively, via which the print image data of cyan (C), magenta (M), yellow (Y), and black (K) colors are respectively transferred. Moreover, the data control units 30a, 30b, 30c, and 30d respectively include the memories 31a, 31b, 31c, and 31d in which is respectively stored the print image data of cyan (C), magenta (M), yellow (Y), and black (K) colors that is transferred from the higher-level device 10 via the data lines 11a, 11b, 11c, and 11d, respectively.

Furthermore, the data control units 30a to 30d are connected to the interface unit 322 of the printer controller 14 via the engine I/F control lines 40a to 40d, respectively. Thus, via the engine I/F control lines 40a to 40d, the interface unit 322 can communicate control signals with the data control units 30a to 30d, respectively, in an independent manner.

Moreover, the printer controller 14 and the carrying control unit 52, which controls the carrying of print sheets, are connected by the carrying control line 41. That enables communication between the printer controller 14 and the carrying control unit 52. More specifically, the carrying control unit 52 is connected to the interface unit 322 of the printer controller 14 by the carrying control line 41. That enables communication between the carrying control unit 52 and the interface unit 322. Moreover, the carrying control unit 52 is also connected to the data control units 30a to 30d by the carrying control line 41.

Figure 6:
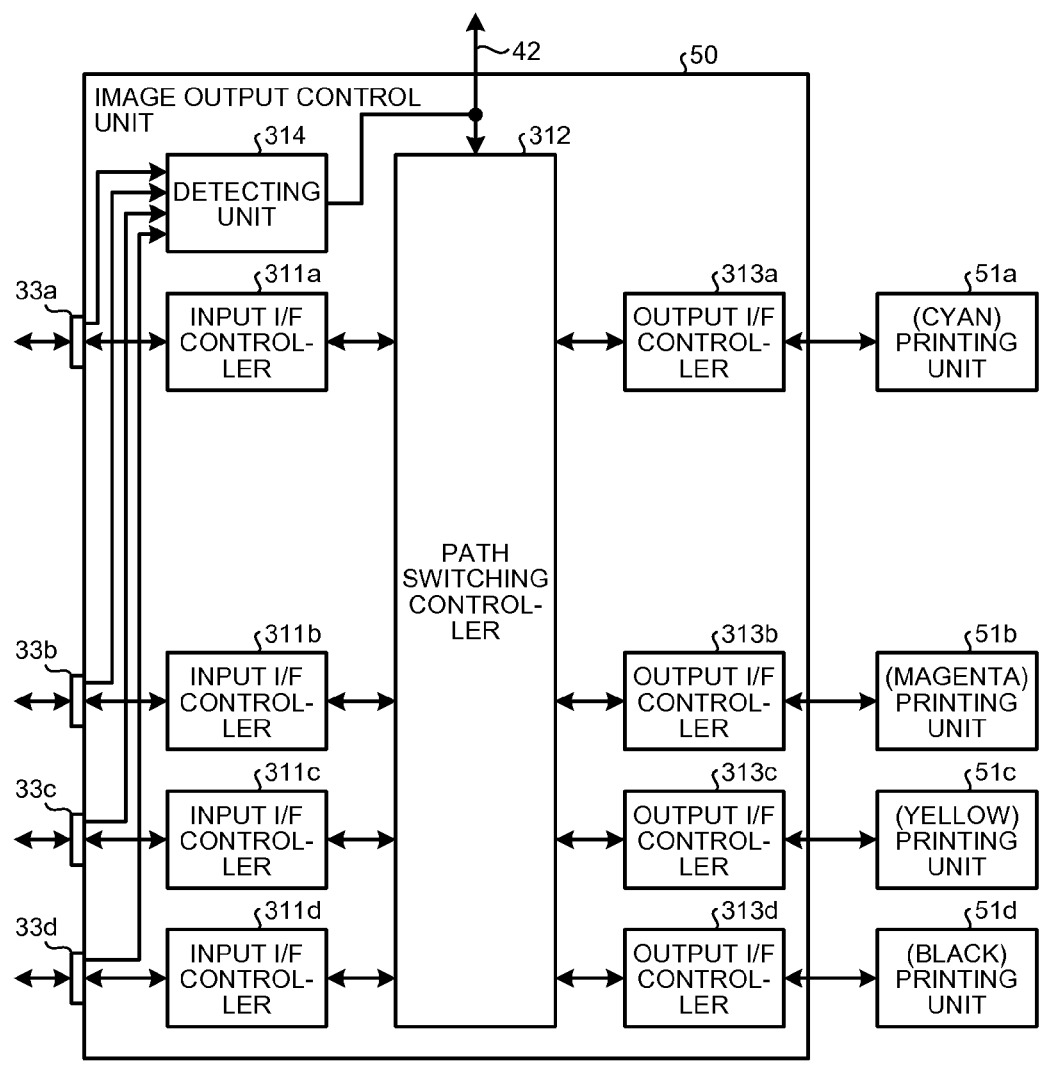
FIG. 6 is a block diagram illustrating an exemplary configuration of an image output control unit according to the embodiment.

FIG. 6 is a block diagram illustrating an exemplary configuration of the image output control unit 50. Herein, the image output control unit 50 includes a path switching controller 312; a plurality of input I/F controllers 311a, 311b, 311c, and 311d corresponding to the plurality of data control units 30a, 30b, 30c, and 30d, respectively; a plurality of output I/F controllers 313a, 313b, 313c, and 313d corresponding to the printing units 51a, 51b, 51c, and 51d, respectively; and a detecting unit 314.

The connecting units 33a to 33d are connected to the input I/F controllers 311a to 311d, respectively. Moreover, the data control units 30a to 30d are connected to the connecting units 33a to 33d, respectively, from the outside of the image output control unit 50. For example, the print image data output from the data control unit 30a is input to the input I/F controller 311a via the connecting unit 33a, and is then sent to the path switching controller 312 from the input I/F controller 311a. The detecting unit 314 detects the data control units 30 that are connected to the connecting units 33a to 33d, and obtains the identification information of the data control units 30 that are connected. Then, the detecting unit 314 sends the detection result and the obtained identification information to the printer controller 14 via the communication line 42.

The printer controller 14 sends setting information for the image output control unit, which is used in setting paths for the print image data, to the path switching controller 312 via the communication line 42. Then, according to the setting information for the image output control unit, the path switching controller 312 selects connection paths between itself and the input I/F controllers 311a to 311d as well as selects connection paths between itself and the output I/F controllers 313a to 313d.

The print image data sent to the path switching controller 312 is then provided to one or more of the output I/F controllers 313a to 313d via the paths selected according to the setting information for the image output control unit. Then, the output I/F controllers 313a to 313d send the received print image data to the printing units 51a to 51d, respectively.

FIG. 7 is a block diagram illustrating in detail an exemplary configuration of the path switching controller 312. Herein, the path switching controller 312 includes a buffer 330; a data distribution control unit 331; buffers 332a, 332b, 332c, and 332d; an address managing unit 333; a path switching unit 334; and a counter 335. The buffer 330 includes areas #1, #2, #3, and #4 that respectively correspond to the input I/F controllers 311a, 311b, 311c, and 311d. Each of the areas #1 to #4 either can be a block having continuous addresses allocated thereto or can have, for example, addresses sorted in units of rasters.

The print image data output from the input I/F controllers 311a to 311d is stored in the areas #1 to #4 of the buffer 330, respectively. The address managing unit 333 obtains the size of the print image data that is sent by each of the input I/F controllers 311a to 311d to the buffer 330. Then, based on each obtained size, the address managing unit 333 decides on the write address in the buffer 330 for writing the print image data. Then, each of the input I/F controllers 311a to 311d reads the write address in the buffer 330 from the address managing unit 333. Moreover, the address managing unit 333 obtains, via the data distribution control unit 331, the address and the size of the print image data stored in each of the buffers 332a to 332d; and manages those addresses and sizes.

The setting information for the image output control unit, which is sent from the interface unit 322 via the communication line 42, is input to the path switching unit 334 in the path switching controller 312 and is written in a register or the like. Then, the path switching unit 334 refers to the setting information for the image output control unit that is written in a register, and provides path setting parameters to the data distribution control unit 331, the address managing unit 333, and the counter 335.

To the counter 335 is connected one of the engine I/F control lines 40a to 40d (herein, it is assumed that the engine I/F control line 40a is connected). Thus, via the engine I/F control line 40a, the counter 335 receives a control signal including an initial print position instruction that is sent by the interface unit 322. With the reception of the initial print position instruction as the trigger, the counter 335 starts performing counting and, when the count reaches a predetermined value, causes the data distribution control unit 331 to read the print image data output from the buffers 332a to 332d and output it to the printing units 51a to 51d, respectively.

The data distribution control unit 331 identifies the path for the print image data as well as identifies the printing sequence according to the parameters that are sent by the path switching unit 334 by referring to the setting information for the image output control. Then, from the print image data stored in the buffer 330, the data distribution control unit 331 retrieves raster data according to the printing sequence that is identified from the parameters; and provides the raster data to the buffers 332a to 332d using the paths identified from the parameters.

FIG. 8 is an exemplary functional block diagram for explaining the functions of the printer controller 14. Herein, the printer controller 14 includes the interface unit 322, a table creating unit 325, an obtaining unit 326, a transfer unit 327, and a memory unit 328. Of those constituent elements; for example, the functions of the table creating unit 325, the obtaining unit 326, and the transfer unit 327 can be implemented using a computer program running in the CPU 321. However, that is not the only possible case. Alternatively, the functions of the table creating unit 325, the obtaining unit 326, and the transfer unit 327 can be implemented by means of coordination between the operations performed by the CPU 321 according of a computer program and the operations performed by a processor of the interface unit 322.

The obtaining unit 326 refers to the detection result of the detecting unit 314 that is sent from the image output control unit 50 via the communication line 42; and obtains the number and the positions of the data control units 30 that are connected to the image output control unit 50 in the station 60. Along with that, the obtaining unit 326 obtains identification information of the data control units 30 that are connected to the detecting unit 314 of the image output control unit 50. Then, the obtaining unit 326 stores the information related to the data control units 30 in the memory unit 328.

Meanwhile, the obtaining unit 326 can obtain the information related to the data control units 30 also by means of communication performed via the engine I/F control lines 40a to 40d.

Moreover, the obtaining unit 326 can communicate with the image output control unit 50 via the communication line 42, and obtain the color identification information of the printing units 51a to 51d. For example, the obtaining unit 326 communicates with the printing units 51a to 51d via the path switching controller 312 and via the output I/F controllers 313a to 313d, respectively; and obtains the color identification information indicating a printing color from each of the printing units 51a to 51d. Then, the obtaining unit 326 stores the color identification information in the memory unit 328.

Meanwhile, alternatively, the information related to the printing color of each of the printing units 51a to 51d can be input by a user from the operation panel 323. In that case, for example, the obtaining unit 326 communicates via the communication line 42 and obtains the number of stations 60 that are connected to the printer engine 15; and sends the information regarding the number of stations 60 to the CPU 321. Depending on the number of stations 60, the CPU 321 displays, on a display unit of the operation panel 323, interface screens that allow the input of the printing colors of the printing units 51a to 51d included in each station 60. The information related to the printing colors that is input from the operation panel 323 is then obtained as the color identification information by the obtaining unit 326 via the CPU 321.

Based on the information regarding the data control units 30 and the information regarding the printing colors that is stored in the memory unit 328; the table creating unit 325 generates setting information that is used in printing of the print image data, which is output from the data control units 30 connected to the connecting units 33a to 33d, to be performed by the printing units 51a to 51d. More particularly, the table creating unit 325 generates setting information for the data control unit based on the information regarding the data control units 30, and generates setting information for the image output control unit based on the color identification information. Then, the table creating unit 325 stores the setting information for the data control unit and the setting information for the image output control unit in the memory unit 328. The details regarding the setting information for the data control unit and the setting information for the image output control unit are given later.

Subsequently, via the engine I/F control lines 40a to 40d, the transfer unit 327 transfers the setting information for the data control unit, which is generated by the table creating unit 325 and stored in the memory unit 328, to the data control units 30 that are connected to the connecting units 33a to 33d. Moreover, via the communication line 42, the transfer unit 327 transfers the setting information for the image output control unit, which is generated by the table creating unit 325 and stored in the memory unit 328, to the image output control unit 50.

Print Sheet Carrying System

The carrying control unit 52 communicates with the printer controller 14 via the carrying control line 41, and controls the carrying of the printing medium on which images are formed by the printing units 51a to 51d on the basis of the print image data. FIG. 9A is an outlined line drawing schematically illustrating an exemplary structure of a printer device 200 that includes a printing medium carrying system and that is applicable to the embodiment. As described above, in the printer device 200 according to the present embodiment, the print sheet 201 that is used as the printing medium is a continuous sheet.

The print sheet 201 is fed from a print sheet feeding unit 210 that includes the printer controller 14, and is then sent to the printer engine 15 via a power source operation box 220. The printer engine 15 includes a first carrying unit 230 and a second carrying unit 260 that have the carrying control unit 52 disposed therein, as well as includes stations that form images on the print sheet 201 on the basis of the print image data. In this example, the printer device 200 includes a plurality of stations 250a and 250b.

In the printer engine 15, the print sheet 201 is firstly fed to the first carrying unit 230 and is carried by a plurality of rollers to the second carrying unit 260 via the stations 250a and 250b. Then, under the control of the carrying control unit 52, the carrying control with respect to the print sheet 201 is performed in the second carrying unit 260. For example, the print sheet 201 is driven in the printing direction (paper feeding direction) by a carrying driving roller disposed in the second carrying unit 260. Moreover, in the first carrying unit 230, a small amount of load in the opposite direction to the printing direction is applied to the print sheet 201. With that, any slack in the print sheet 201 is eliminated.

On the output side of the first carrying unit 230 is disposed a position sensor 241 that is used in aligning the print sheet 201 with respect to a reference position. For example, if the print sheet 201 is a continuous sheet perforated at predetermined intervals, the alignment thereof is done in such a way that the perforations match with the reference position. As far as the alignment in the width direction of the print sheet 201 is concerned; in the head unit of each of the printing units 51a to 51d, the allocation of image data in the line corresponding to each nozzle in the nozzle arrays 511 can be adjusted to align the print sheet 201 in the width direction.

Each of the stations 250a and 250b has the same configuration as the configuration of the station 60. Thus, each of the stations 250a and 250b includes the data control units 30a to 30d and the image output control unit 50, and performs printing with respect to the print sheet 201 on the basis of print image data. In the present embodiment, in addition to the stations 250a and 250b, it is possible to dispose more stations in the printer device 200. In the example illustrated in FIGS. 9A and 9B, two stations 250a and 250b are connected to the printer device 200. Each of the stations 250a and 250b is identified by the printer controller 14 by referring to identification information that is output by an identifying unit (not illustrated).

Herein, it is necessary that the positional relationship between the reference position and each station (in the example illustrated in FIG. 9A, the stations 250a and 250b) is fixed. Moreover, in the case of a configuration in which more stations can be disposed with respect to the printer device 200, it is desirable that each station has an independent configuration with respect to the printer device 200.

Figure 9B:
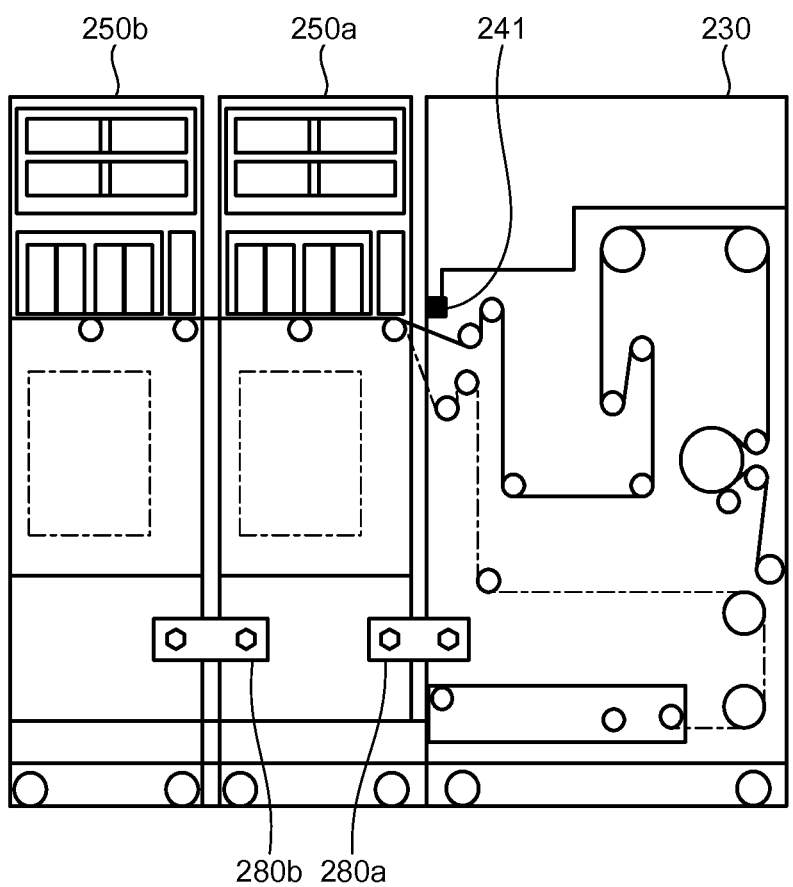
FIG. 9B is an outlined line drawing illustrating an example in which a first carrying unit and a plurality of stations are fixed using connecting fittings.

As an example, it is thinkable to fix the first carrying unit 230, which has the reference position, and the stations using connecting fittings. FIG. 9B is an outlined line drawing illustrating an example in which the first carrying unit 230 and the station 250a are fixed using a connecting fitting 280a, while the stations 250a and 250b are fixed using a connecting fitting 280b. To the stations 250a and 250b and the first carrying unit 230, the connecting fittings 280a and 280b are attached using junction components such as bolts and nuts. With that, it becomes possible to have a fixed positional relationship between the reference position and the station 250a and have a fixed positional relationship between the reference position and the station 250b.

Alternatively, it is also possible to make use of a latch mechanism to mutually fix the first carrying unit 230, the station 250a, and the station 250b. With that, it becomes possible to maintain a fixed positional relationship between the reference position and the station 250a and maintain a fixed positional relationship between the reference position and the station 250b.

The station 250a, the station 250b, and the second carrying unit 260 are connected to the printer controller 14 by a predetermined cable (not illustrated). Thus, the communication performed using the engine I/F control lines 40a to 40d or using the communication line 42 as well as the communication performed using the carrying control line 41 is carried out via that cable. Besides, the stations 250a and 250b are connected to the higher-level device 10 (not illustrated) via that cable and via the printer controller 14, and the image data of each color is transferred therebetween using the data lines 11a to 11d.

Once the printing is performed, the print sheet 201 is discharged from the second carrying unit 260 and is sent to a cutter unit 270. Then, the cutter unit 270 cuts the print sheet 201 along the perforations and separates the pages.

Herein, the printer device 200 performs printing on the print sheet 201 that is a continuous sheet having continuous pages. Hence, after printing on the print sheet 201 is performed in the stations 250a and 250b, the print sheet 201 is constantly present in the path through which it is discharged from the second carrying unit 260.

Meanwhile, if a pair of configurations each including the first carrying unit 230, the stations 250a and 250b, and the second carrying unit 260 is provided; then the post-printing print sheet 201 discharged from the second carrying unit 260 of the configuration in front can be inverted and fed to the first carrying unit 230 of the configuration in the rear. That makes it possible to perform duplex printing with respect to the print sheet 201.

Setting Information According to First Configuration

Given below is the explanation regarding setting information that is generated by the printer controller 14 according to the first configuration in which printing of process colors is performed. As described above, in the printer controller 14, the table creating unit 325 generates the setting information for the data control unit based on the information of the data control units 30 as well as generates the setting information for the image output control unit based on the color identification information.

FIG. 10 illustrates a table in which the setting information for the data control unit that is applicable to the first configuration is stored. FIG. 11 illustrates a table in which the setting information for the image output control unit that is applicable to the first configuration is stored. As illustrated in FIG. 10, the table of the setting information for the data control unit contains common items and data-control-unit peculiar items. The common items are the items set commonly regarding the plurality of data control units 30 included in the same station. In this example, the following items are set as the common items: number of stations; station location number; and number of data control units per station.

The common item "number of stations" indicates the number of stations disposed in the printer engine 15. The common item "station location number" indicates the location of the station 60, which includes the data control units 30 to which the table of the setting information for the data control unit is sent, within the printer engine 15. For example, station location numbers are sequentially assigned in ascending order starting from the station that, for example, is disposed closest to the printer controller 14 in the printer engine 15. The common item "number of data control units per station" indicates the number of data control units 30 that are connected to the station 60, which includes the data control units 30 to which the table of the setting information for the data control unit is sent.

In the first configuration, as illustrated in FIG. 3, the printer engine 15 includes a single station 60 to which the four control data units 30a to 30d are connected. Thus, the common item "number of stations" has the value "1" set therein, the common item "station location number" has the value "1" set therein, and the common item "number of data control units per station" has the value "4" set therein. Meanwhile, the station 60 can get to know about the location of itself by, for example, referring to the settings of a DIP switch or the like that is disposed therein.

Meanwhile, in a data-control-unit peculiar item, a data control unit number and the color processed by the data color unit having that data control unit number are held in a corresponding manner. The data control unit numbers represent the identification information used in identifying the data control units 30 in the station 60.

In the example illustrated in FIG. 10, with items having item numbers "4" to "7", it is defined that the data control unit that has the data control unit number "1" and that is disposed closest to the printer controller 14 processes the cyan (C) color. The other data control units are sequentially positioned farther from the printer controller 14. Accordingly, it is defined that the data control unit having the data control unit number "2" processes the magenta (M) color; the data control unit having the data control unit number "3" processes the yellow (Y) color; and the data control unit having the data control unit number "4" processes the black (K) color.

Meanwhile, in the first configuration, the common item "number of data control units per station" having the item number "3" has the value "4" set therein. Therefore, it is defined that a single station includes four data control units having the data control unit numbers "1", "2", "3", and "4". More particularly, the data control units having the data control unit numbers "1", "2", "3", and "4" are considered to be the data control units 30a, 30b, 30c, and 30d, respectively, of the station 60; and are considered to process the print image data of cyan (C), magenta (M), yellow (Y), and black (K) colors, respectively.

FIG. 11 illustrates a table of the setting information for the image output control unit in the first configuration. In the table of setting information for the image output control unit, an item "number of input I/F controllers" indicates the number of input I/F controllers disposed in the image output control unit 50. In this example, since the image output control unit 50 includes four input I/F controllers 311a to 311d; the item "number of input controllers" having the item number "1" has the value "4" set therein. An item "station location number" indicates the location of the station 60, which includes the image output control unit 50 to which the table of the setting information for the image output control unit is sent.

An item "color information" represents the color information indicating the color used for printing by each of the printing units 51a to 51d of the image output control unit 50. In this example, with respect to four printing units "#1" to "#4" of the image output control unit 50 that is disposed in the station 60 having the location number "1" (in the item having the item number "2"); it is defined that the cyan (C) color, the magenta (M) color, the yellow (Y) color, and the black (K) color are respectively assigned (see the items having the item numbers "3" to "6"). More particularly, the printing units "#1" to "#4" respectively correspond to the printing units 51a to 51d. Thus, the cyan (C) color is assigned to the printing unit 51a; the magenta (M) color is assigned to the printing unit 51b; the yellow (Y) color is assigned to the printing unit 51c; and the black (K) color is assigned to the printing unit 51d.

At the time of starting the printer device 13; for example, the CPU 321 controls the interface unit 322, instructs the obtaining unit 326 to start communication with each data control unit 30 and with the image output control unit 50, and to obtain necessary information from each data control unit 30 and from the image output control unit 50. Then, the CPU 321 instructs the table creating unit 325 to generate a table of the setting information for the data control unit and a table of the setting information for the image output control unit based on the variety of information obtained by the obtaining unit 326. Moreover, the CPU 321 controls the transfer unit 327, and sends the table of the setting information for the data control unit to the data control units 30 and sends the table of the setting information for the image output control unit to the image output control unit 50.

In the image output control unit 50, the table of the setting information for the image output control unit that is received is provided to the path switching controller 312. Then, based on the table of the setting information for the image output control unit, the path switching controller 312 selects a path for the print image data of each color.

For example, based on the location information set in the station 60 with the use of a DIP switch, the image output control unit 50 can get to know that the station 60 to which it belongs is the nearest station to the printer controller 14. Herein, in the table of the setting information for the image output control unit, since the item having the item number "2" has the value "1" set therein; the image output control unit 50 can recognize that the table of the setting information for the image output control unit corresponds to itself. Moreover, based on the item having the item number "1", the image output control unit 50 understands that all of the four input I/F controllers 311a to 311d disposed therein are to be used in the current configuration. Thus, the image output control unit 50 gets to know that print image data would be input to each of the input I/F controllers 311a to 311d. Furthermore, based on the items having the item numbers "3" to "6", the image output control unit 50 gets to know that the printing units 51a to 51d perform printing of cyan (C), magenta (M), yellow (Y), and black (K) colors, respectively.

Accordingly, the image output control unit 50 controls the data distribution control unit 331 to select paths in such a way that the print image data input to the input I/F controllers 311a to 311d is provided to the printing units 51a to 51d, respectively.

Meanwhile, the table of the setting information for the data control unit is written in a register in each of the data control units 30a to 30d that are disposed in the station 60. Thus, each of the data control units 30a to 30d can refer to the table of the setting information for the data control unit written in the corresponding register, and can identify the configuration of the printer engine 15.

Taking the data control unit 30a as an example; based on the items having the item numbers "1" and "2" in the table of the setting information for the data control unit, the data control unit 30a gets to know that the station 60 to which it belongs is disposed closest to the printer controller 14 and gets to know that the printer engine 15 includes a single station 60. Moreover, based on the item having the item number "3", the data control unit 30a gets to know that the station 60 to which it belongs includes four data control units 30a to 30d.

Furthermore, based on the items having the item numbers "4" to "7", the data control unit 30a gets to know that the data control units 30a to 30d respectively having identification information "1" to "4" process the print image data respectively of the cyan (C) color, the magenta (M) color, the yellow (Y) color, and the black (K) color. As described above, the identification information for identifying the data control unit 30a is set in advance by the setting unit 137. For that reason, the data control unit 30a that has the identification information set to "1" by the setting unit 137 gets to know that it is associated with the cyan (C) color in the item having the item number "4".

Figure 12:
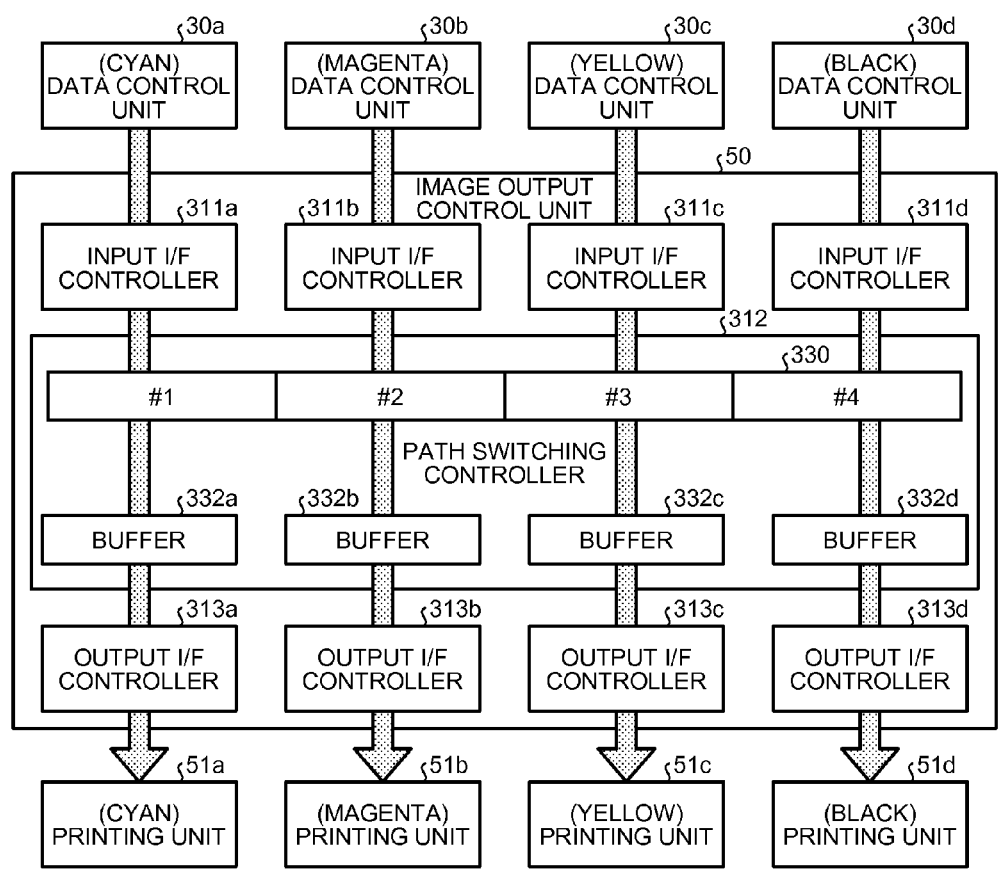
FIG. 12 is an outlined line drawing schematically illustrating flows of print image data from data control units to printing units according to the first configuration illustrated in FIG. 3.

FIG. 12 schematically illustrates flows of the print image data from the data control units 30a to 30d to the printing units 51a to 51d, respectively, in the station 60 according to the first configuration illustrated in FIG. 3. In FIG. 12, the constituent elements identical to the constituent elements illustrated in FIGS. 6 and 7 are referred to by the same reference numerals, and the detailed explanation thereof is not repeated.

In the first configuration in which printing of process colors is performed; the printer engine 15 includes a single station 60 in which printing on a printing medium is performed on the basis of the print image data of each of the cyan (C) color, the magenta (M) color, the yellow (Y) color, and the black (K) color that is transferred from the higher-level device 10. The print image data of each of the cyan (C) color, the magenta (M) color, the yellow (Y) color, and the black (K) color is transferred from the higher-level device 10 to the data control units 30a to 30d, respectively, and is input to the input I/F controllers 311a to 311d, respectively. Then, the print image data of each of the cyan (C) color, the magenta (M) color, the yellow (Y) color, and the black (K) color that is input to the input I/F controllers 311a to 311d, respectively, is stored in the areas #1 to #4, respectively, of the buffer 330 in the path switching controller 312.

Herein, the path switching controller 312 can refer to the setting information for the image output control unit and recognize that the print image data of each of the cyan (C) color, the magenta (M) color, the yellow (Y) color, and the black (K) color is printed by the printing units 51a to 51d, respectively. Consequently, the path switching unit 334 controls the data distribution control unit 331 so that the print image data of each of the cyan (C) color, the magenta (M) color, the yellow (Y) color, and the black (K) color that is respectively read from the areas #1 to #4 of the buffer 330 is stored in the buffers 332a to 332d, respectively. At that time, it is desirable if the print image data of each of the cyan (C) color, the magenta (M) color, the yellow (Y) color, and the black (K) color is rearranged in the order suitable for high-speed printing and then stored in the buffers 332a to 332d, respectively.

The path switching controller 312 measures a printing timing on the basis of the count of the counter 335, which performs counting by considering the initial print position instruction sent from the printer controller 14 in synchronization with paper carrying as the trigger. When the printing timing is reached, the path switching controller 312 reads the print image data of each of the cyan (C) color, the magenta (M) color, the yellow (Y) color, and the black (K) color from the buffers 332a to 332d, respectively. Then, the print image data of each of the cyan (C) color, the magenta (M) color, the yellow (Y) color, and the black (K) color that has been read is provided for printing purposes to the printing units 51a to 51d, respectively, via the output I/F controllers 313a to 313d, respectively.

Operations of Station

Figure 13:
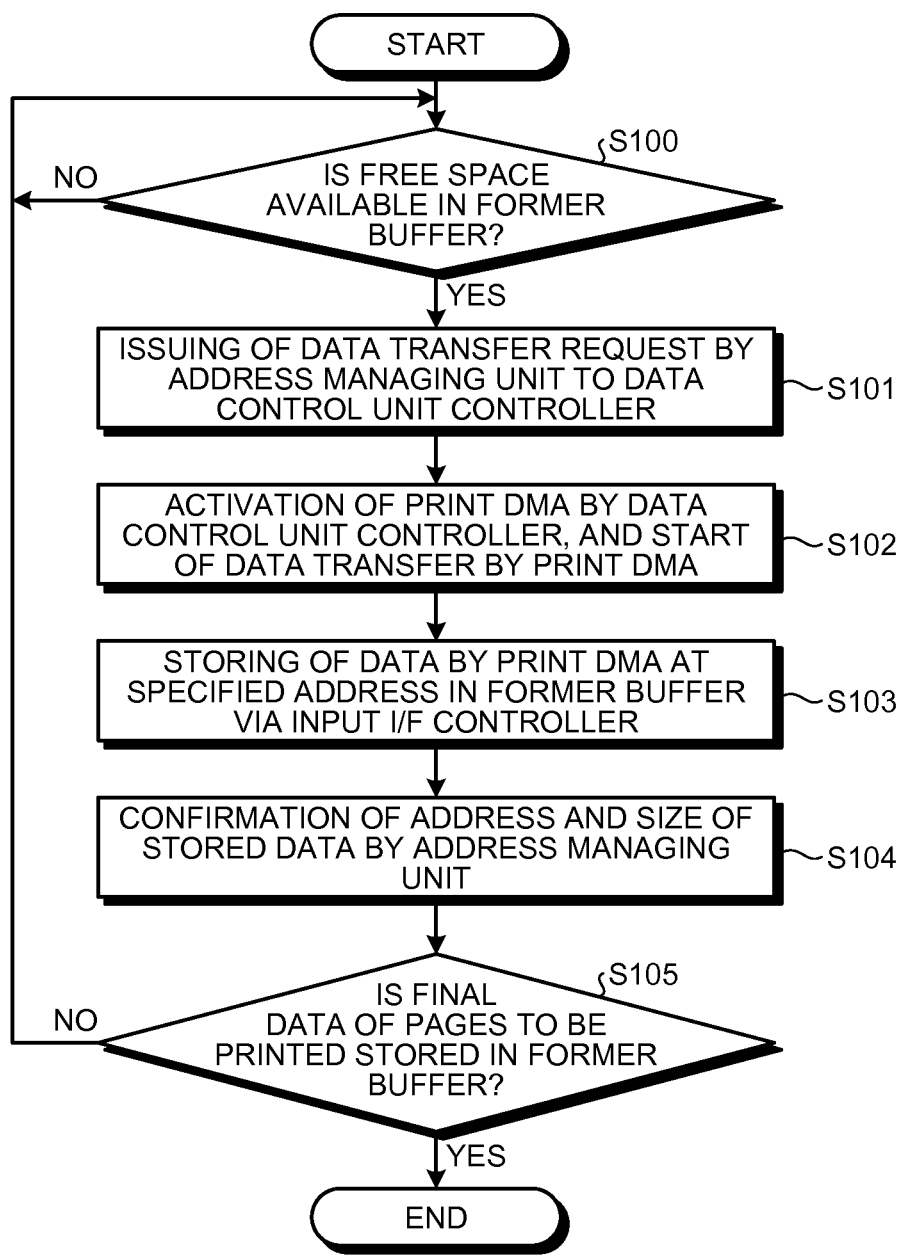
FIG. 13 is a flowchart for explaining exemplary operations according to the embodiment starting from receiving a print instruction to storing print image data in a former buffer.
Figure 14:
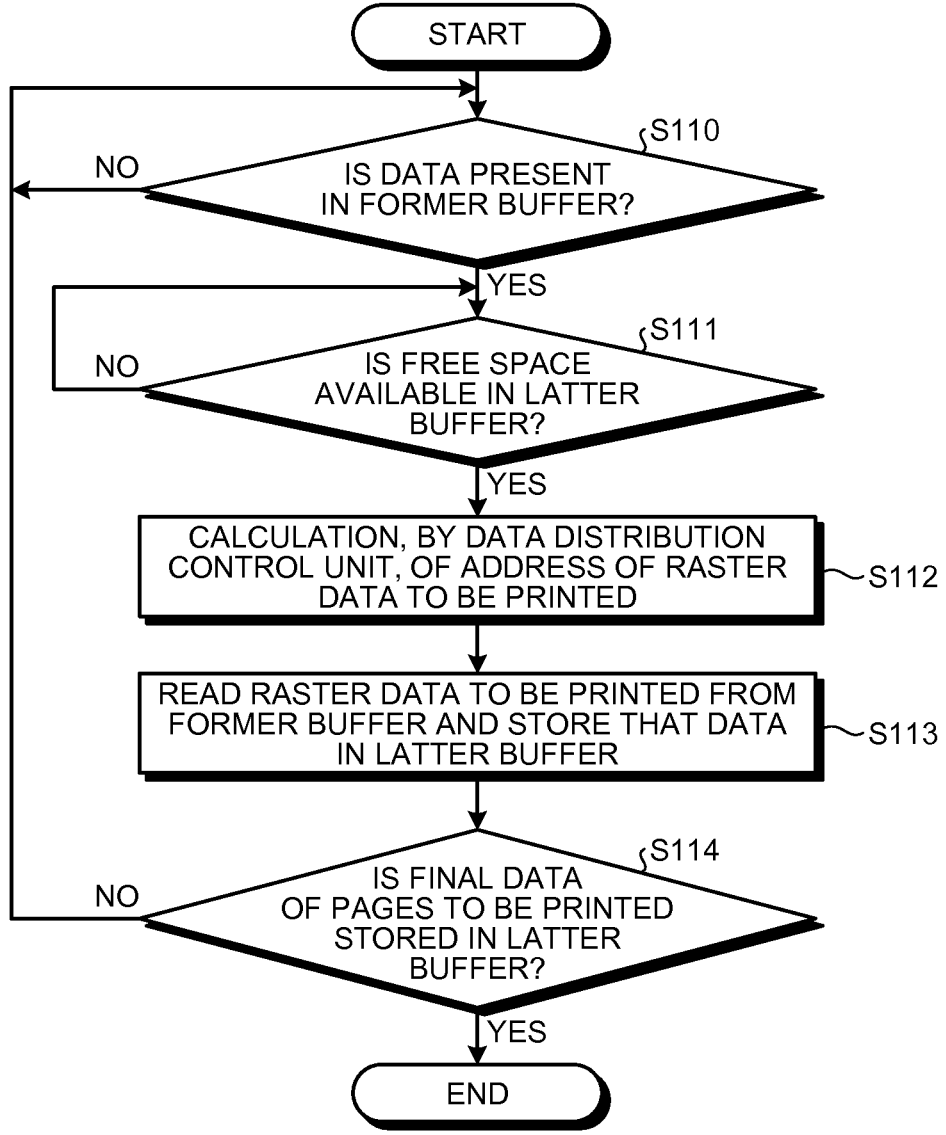
FIG. 14 is a flowchart for explaining exemplary operations according to the embodiment starting from confirming whether or not data is present in the former buffer up to storing print image data in latter buffers.

Explained below with reference to flowcharts illustrated in FIGS. 13 and 14 are the operations performed by the station 60. FIG. 13 is a flowchart for explaining the operations starting from receiving a print instruction from the printer controller 14 to storing the print image data in the former buffer (the buffer 330). FIG. 14 is a flowchart for illustrating the operations starting from confirming whether or not data is present in the former buffer up to storing the print image data in the latter buffers (the buffers 332a to 332d).

The operations performed according to the flowcharts illustrated in FIGS. 13 and 14 are performed in parallel. Moreover, even regarding the print image data of a plurality of colors such as the cyan (C) color, the magenta (M) color, the yellow (Y) color, and the black (K) color; the operations performed according to the flowcharts illustrated in FIGS. 13 and 14 are performed in parallel. Meanwhile, in the following explanation, unless otherwise specified, it is assumed that the printer engine 15 has the first configuration in which printing of process colors is performed, and that the data control unit 30a processes the print image data of the cyan (C) color.

With reference to FIG. 13, the address managing unit 333 determines whether or not free space for storing the print image data of the cyan (C) color is available in the former buffer (in the area #1 of the buffer 330) (Step S100). If it is determined that no free space is available (No at Step S100), then the system control waits until free space becomes available.

On the other hand, if it is determined that free space for storing the print image data of the cyan (C) color is available in the area #1 of the buffer 330 (Yes at Step S100); then the address managing unit 333 communicates with the data control unit controller 135 of the data control unit 30a via a communication line (not illustrated), and issues a data transfer request to the data control unit controller 135 for transferring the print image data of the cyan (C) color (Step S101). Meanwhile, the communication between the address managing unit 333 and the data control unit controller 135 of the data control unit 30a can be performed by sharing the data line that is used in transferring the print image data.

Then, in response to the data transfer request issued by the address managing unit 333 at Step S101, the data control unit controller 135 activates the print DMA 134, and the print DMA 134 starts DMA transfer of the print image data of the cyan (C) color that is stored in the memory 31a (Step S102). Subsequently, the print DMA 134 specifies an address in the former buffer (the area #1 of the buffer 330) via the input I/F controller 311a of the image output control unit 50, and stores the print image data of the cyan (C) color that is read from the memory 31a at the specified address in the buffer 330 (Step S103).

Then, the address managing unit 333 confirms the address and the size of the print image data of the cyan (C) color that is stored in the area #1 of the buffer 330 (Step S104). Subsequently, based on the address and the size of the print image data of the cyan (C) color, the address managing unit 333 determines whether or not the final data of the pages to be printed as specified in a print instruction is stored in the former buffer (in the area #1 of the buffer 330) (Step S105). If it is determined that the final data has been stored (Yes at Step S105), then the operations illustrated in the flowchart in FIG. 13 are stopped. On the other hand, if it is determined that the final data is not yet stored (No at Step S105), then the system control returns to Step S100.

With reference to FIG. 14, the address managing unit 333 determines whether or not the print image data of the cyan (C) color is present in the former buffer (in the area #1 of the buffer 330) (Step S110). If it is determined that the print image data of the cyan (C) color is not present (No at Step S110), then the system control waits until the print image data of the cyan (C) color is stored in the buffer 330. On the other hand, it is determined that the print image data of the cyan (C) color is present (Yes at Step S110), then the address managing unit 333 determines whether or not free space for storing the print image data of the cyan (C) color is available in the latter buffer (the buffer 332a) (Step S111). If it is determined that no free space is available (No at Step S111), then the system control waits until a free space becomes available.

On the other hand, if it is determined that free space is available in the buffer 332a (Yes at Step S110); then the data distribution control unit 331 calculates the address of the print image data (raster data) of the cyan (C) color that is to be printed (Step S112). Then, based on the address calculated at Step S112, the data distribution control unit 331 reads the print image data of the cyan (C) color from the area #1 of the buffer 330, and stores that data in the latter buffer (the buffer 332a) (Step S113).

Subsequently, the address managing unit 333 determines whether or not the final data of the pages to be printed as specified in the print instruction is stored in the latter buffer (in the buffer 332a) (Step S114). If it is determined that the final data has been stored (Yes at Step S114), then the operations illustrated in the flowchart in FIG. 14 are stopped. On the other hand, if it is determined that the final data is not yet stored (No at Step S114), then the system control returns to Step S110.

Details of Printing Process Applicable to Embodiment

Figure 16:
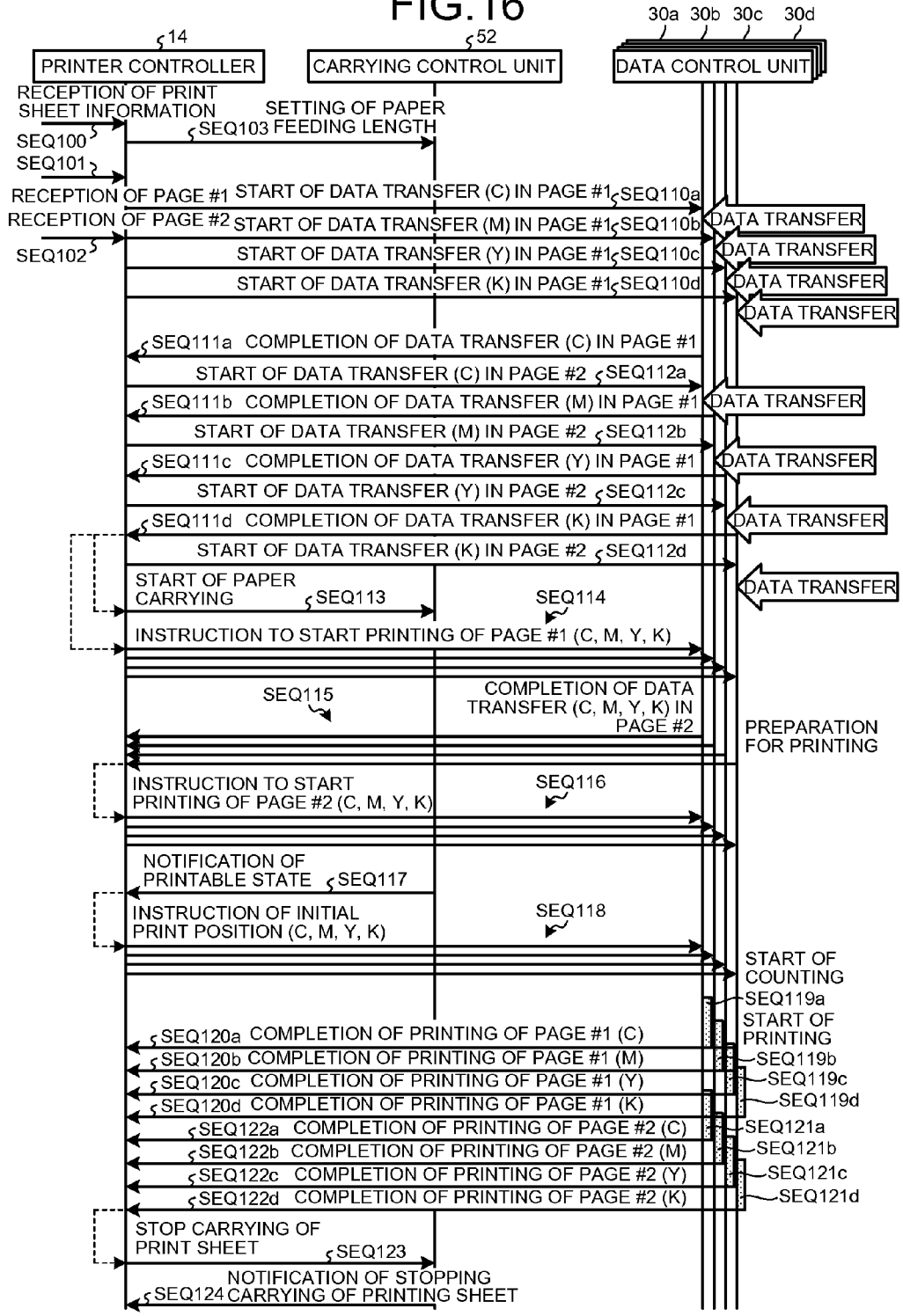
FIG. 16 is a sequence diagram for explaining, on a conceptual basis, an exemplary printing operation performed in the first configuration according to the embodiment.

Explained below with reference to FIGS. 15 and 16 is the printing process that is applicable to the embodiment. FIG. 15 illustrates an example of control information that is communicated between the higher-level device 10 and the printer device 13 via the control line 12. Herein, in FIG. 15, the higher-level device 10 is illustrated as a digital front end processor (DFE) and the printer controller 14 is illustrated as a PCTL. The control information broadly contains (1) job information, (2) information indicating printer status and printing process, (3) information indicating printing conditions, and (4) information indicating connections.

The job information contains a job start notice and a job end notice. The job start notice contains a notification sent from the higher-level device 10 to the printer controller 14 regarding starting a print job, and contains a reply to that notification from the printer device 13 to the higher-level device 10. Moreover, the job start notice contains information related to the image data that is informed in the job start notice and that is to be printed. The job end notice contains a notification sent from the higher-level device 10 to the printer controller 14 regarding ending all printing processes that were requested in the job start notice, and contains a reply to that notification from the printer controller 14 to the higher-level device 10. In the reply included in a job start notice or in a job end notice, the printer controller 14 sends to the higher-level device 10 a job id (JOBID) that is used in identifying the print job.

The (2) information indicating printer status and printing process contains a printing process reception start notification, a printer information request/notification, a printing process start notification, a printing process request, a data transfer completion notification, a data reception completion notification, a printing process completion notification, a process status report, a service control (SC) notification, and an error occurrence and elimination notification.

As for the printing process reception start notification, the printer device 13 notifies the higher-level device 10 that the printer controller 14 is ready to receive a printing process. The printer information request/notification contains a request issued for necessary printer information by the higher-level device 10 to the printer controller 14, and contains a reply to that request from the printer controller 14 to the higher-level device 10.

The printing process start notification contains a notification sent form the higher-level device 10 to the printer controller 14 indicating that the print image data is ready for use, and contains a reply to that notification from the printer device 13 to the higher-level device 10. A print image data readiness notification is issued according to the output sequence of the print image data and in units of pages (in units of processes). Herein, a page is the unit of printing on which printing is performed by a sequence of printing operations.

The printing process request contains a notification regarding the printing process sent from the printer controller 14 to the higher-level device 10, and contains a reply to that notification from the higher-level device 10 to the printer controller 14. Using the printing process request, the printer controller 14 notifies the higher-level device 10 about color information regarding the yellow (Y) color, the cyan (C) color, the magenta (M) color, and the black (K) color that are used in printing or about color information regarding spot colors in the case of performing spot color printing; about a process identification number processID; and about a plane identification number. Herein, it is assumed that planes correspond to the images that are formed using the print image data of each color and that are printed on a single page. The printer controller 14 notifies the abovementioned information on a plane-by-plane basis and according to the sequence of requests from the data control units 30. Thus, the print image data made of bitmap data is retrieved by the printer engine 15 from the higher-level device 10.

The data transfer completion notification is sent by the higher-level device 10 to the printer controller 14 upon completion of transferring the print image data of the requested plane. The data reception completion notification is sent by the printer controller 14 to the higher-level device 10 upon completion of receiving the print image data of the requested plane. The printing process completion notification is sent by the higher-level device 10 to the printer controller 14 upon completion of print requests of all pages (processes). The process status report is a notification sent by the printer controller 14 to the higher-level device 10 about the print state of pages (processes). At that time, the printer controller 14 obtains information related to the paper feeding, paper discharging, and starting of printing from the printer engine 15; and appends that information to the notification to be sent to the higher-level device 10.

The SC notification contains a request issued by the higher-level device 10 to the printer controller 14 about obtaining failure information of the printer device 13, and contains a notification sent by the printer controller 14 to the higher-level device 10 about the failure information obtained in response to that request. The error occurrence and elimination notification is sent by the higher-level device 10 to the printer controller 14 regarding the occurrence of an error in the higher-level device 10 as well as regarding the elimination of that error.

The (3) information indicating printing conditions contains settings of printing conditions, that is, contains a notification sent by the higher-level device 10 to the printer controller 14 about printing conditions; and contains a reply to that notification from the printer controller 14. The examples of printing conditions include the print status, the printing type, the paper feeding information, the print side sequence, the print sheet size, the print data size, the resolution and gradation, and the color information.

The print status indicates, for example, whether to perform duplex printing or to perform single-side printing with respect to the print sheet 201. The printing type indicates whether the print image data is available and is to be printed or whether the print image data is not available and a blank sheet is to be output. The paper feeding/paper discharging information indicates identification information of the paper feeding source of the print sheet 201 and identification information of a stacker serving as the paper discharging destination. The print side sequence indicates whether to firstly print on the front side of the print sheet 201 followed by printing on the rear side or to firstly print on the rear side of the print sheet 201 followed by printing on the front side. The print sheet size indicates the length, in the carrying direction of the print sheet 201, of the page on which printing is to be performed. The print data size indicates the data size of the print image data. That is, the print data size indicates the size of the print image data worth a single page. The resolution and gradation indicates the resolution and the gradation at the time of printing the print image data on the print sheet 201. The color information indicates, for example, whether to perform printing using all of cyan (C), magenta (M), yellow (Y), and black (K) colors; or whether to perform printing using only the black (K) color; or whether to perform printing using spot colors.

The (4) information indicating connections contains registration and cancellation, and is used in the higher-level device 10 as well as in the printer controller 14 to register information of each other and to cancel the registered information.

Printing Sequence

Given below is the explanation of a printing operation performed in the first configuration according to the embodiment. FIG. 16 is a sequence diagram for explaining, on a conceptual basis, an exemplary printing operation performed in the first configuration. Herein, it is assumed that full-color printing is performed using all of the processing colors of cyan (C), magenta (M), yellow (Y), and black (K). Moreover, prior to the execution of the operations according to the sequence illustrated in FIG. 16, it is assumed that a variety of information in the printer controller 14 has been obtained; the table of the setting information for the data control unit and the table of the setting information for the image output control unit have been created based on the obtained information; and those tables have been sent to the station 60.

The printer controller 14 receives, as control information, the information related to the print sheet 201 from the higher-level device 10 (SEQ 100), and accordingly sets the paper feeding length with respect to the carrying control unit 52 (SEQ 103). Herein, for example, the paper feeding length is equal to the size of a single page in the carrying direction.

From the higher-level device 10, the printer controller 14 receives control information indicating a job start notice with respect to the first page (page #1) (SEQ 101), and issues requests to the data control units 30a to 30d to start data transfer regarding the cyan (C) color, the magenta (M) color, the yellow (Y) color, the black (K) color, respectively, in the first page (SEQ 110a, SEQ 110b, SEQ 110c, and SEQ 110d). In response to the request at SEQ 110a, the data control unit 30a issues a request to the higher-level device 10 via the data line 11a for the print image data of the cyan (C) color in the first page; and then stores the print image data of the cyan (C) color in the first page, which is transferred from the higher-level device 10 in response to that request, in the memory 31a.

In an identical manner, in response to the requests at SEQ 110b to SEQ 110d, the data control units 30b to 30d issue requests to the higher-level device 10 via the data lines 11c to 11d, respectively, for the print image data of the magenta (M) color, the yellow (Y) color, and the black (K) color, respectively, in the first page. Then, the print image data of the magenta (M) color, the yellow (Y) color, and the black (K) color in the first page, which is transferred from the higher-level device 10 in response to the requests, is stored by the data control units 30b to 30d in the memories 31b to 31d, respectively.

Meanwhile, in the example illustrated in FIG. 16, while the printer controller 14 is issuing requests to the data control units 30a to 30d to start data transfer of data in the first page; the printer controller 14 receives control information, which indicates a job start notice with respect to the second page, from the higher-level device 10 (SEQ 102). The received print job is held in a memory (not illustrated).

Once the print image data of all colors in the first page is completely transferred from the higher-level device 10; then each of the data control units 30a to 30d notifies the printer controller 14 about the completion of data transfer (SEQ 111a, SEQ 111b, SEQ 111c, and SEQ 111d). In response to each of those notifications, the printer controller 14 issues requests to the data control units 30a to 30d to start data transfer of the second page (page #2) (SEQ 112a, SEQ 112b, SEQ 112c, and SEQ 112d).

In response to the requests, the data control units 30a to 30d issue requests to the higher-level device 10 for the print image data of the respective colors in the second page. Then, the data control units 30a to 30d store the print image data of the respective colors in the second page, which is transferred from the higher-level device 10 in response to the requests, in the memories 31b to 31d, respectively.

Meanwhile, the data control units 30a to 30d can get to know about the completion of data transfer on the basis of the data volume of the print image data that is transferred. For example, at the time of starting data transfer to the data control units 30a to 30d, the higher-level device 10 appends, at the start of the print image data, the information indicating the data volume of the print image data worth a single page. Meanwhile, in a case when the print image data is transferred in predetermined units of transfer, the higher-level device 10 can append the information indicating the completion of data transfer of a single page to the last unit of transfer of the print image data of that single page. Alternatively, immediately after transferring the print image data of a single page, the higher-level device 10 can separately send information indicating the completion of data transfer of that single page to the data control units 30a to 30d.

Meanwhile, when the printer controller 14 receives a notification from each of the data control units 30a to 30d about the completion of data transfer of the first page, the printer controller 14 issues a paper carrying start request to the carrying control unit 52 (SEQ 113). In response to the paper carrying start request, the carrying control unit 52 starts carrying the print sheet 201 at a predetermined speed. Along with issuing a paper carrying start request to the carrying control unit 52, the printer controller 14 instructs the data control units 30a to 30d to start printing of the first page (SEQ 114).

When the print sheet 201 reaches, for example, a predetermined position; the carrying control unit 52 informs the printer controller 14 that the print sheet 201 is in a printable state (SEQ 117). In response to the printable state report received from the carrying control unit 52, the printer controller 14 instructs the data control units 30a to 30d about the initial print position (SEQ 118).

According to the initial print position instruction, each of the data control units 30a to 30d starts the printing. For example, in the station 60, with the reception of the initial print position instruction as the trigger, the counter 335 of the path switching controller 312 starts counting a raster count. In the station 60, when the count of the counter 335 reaches a predetermined value; firstly, from the memory 31a, the data control unit 30a starts reading the print image data of the cyan (C) color in the first page. Then, the print image data of the cyan (C) color that is read from the memory 31a is transferred to the image output control unit 50. The printing unit 51a of the image output control unit 50 receives that print image data and accordingly performs printing on the print sheet 201 (SEQ 119a). Once the printing of the print image data of the cyan (C) color in the first page is completed, the printer controller 14 is notified about the same (SEQ 120a).

In an identical manner, when the count of the counter 335 reaches a predetermined value, the data control unit 30b starts reading the print image data of the magenta (M) color from the memory 31b and provides that data to the printing unit 51b. Then, the printing unit 51b performs printing on the print sheet 201 (SEQ 119b). Once the printing of the print image data of the magenta (M) color in the first page is completed, the printer controller 14 is notified about the same (SEQ 120b).

The printing of the print image data of the yellow (Y) color and the print image data of the black (K) color is sequentially started (SEQ 119c and SEQ 119d) in an identical manner. Once the printing is completed, the printer controller 14 is notified about the same (SEQ 120c and SEQ 120d).

Meanwhile, when the data transfer started at SEQ 112a to SEQ 112d for transferring the print image data of each color in the second page is completed; the data control units 30a to 30d notify the printer controller 14 about the same (SEQ 115). In response to the notifications about the completion of the data transfer, the printer controller 14 instructs the data control units 30a to 30d to start performing printing of the second page (SEQ 116).

When the printing of the first page is completed and when the count of the counter 335 reaches a predetermined value after being reset, each of the data control units 30a to 30d starts the printing of the second page.

For example, after the printing of the first page (SEQ 120a) is completed; when the count of the counter 335 reaches a predetermined value, the data control unit 30a reads the print image data of the cyan (C) color in the second page from the memory 31a and transfers that data to the image output control unit 50 for the purpose of starting the printing on the print sheet 201 (SEQ 121a). Once the printing of the print image data of the cyan (C) color is completed, the printer controller 14 is notified about the same (SEQ 122a).

In an identical manner, when the count of the counter 335 reaches a predetermined value, the data control units 30b to 30d read the print image data of the respective colors from the memories 31b to 31d, respectively, and transfer that data to the image output control unit 50 for the purpose of starting the printing on the print sheet 201 (SEQ 121b to SEQ 121d). When the printing of each color is completed, the printer controller 14 is informed about the same (SEQ 122b to SEQ 122d).

Once a notification about the completion of printing of the black (K) color in the second page is received from the data control unit 30d, the printer controller 14 assumes that the last page in the print job has been printed and thus issues a request to the carrying control unit 52 to stop carrying the print sheet 201 (SEQ 123). In response to that request, the carrying control unit 52 stops carrying the print sheet 201 and notifies the printer controller 14 about the same (SEQ 124). That marks the end of the sequence of printing operations.

Second Configuration

Given below is the explanation of performing printing in a second configuration according to the embodiment. In the second configuration, printing is performed using not only the process colors of cyan (C), magenta (M), yellow (Y), and black (K); but also using colors called spot colors, which are difficult to express using only the process colors. Thus, the examples of spot colors include red or green having high color purity, bright orange, and shocking pink. Moreover, herein, transparent colors using clear toners are also assumed to be spot colors.

In the printer engine 15 that includes the station 60 having the four printing units 51a to 51d; if, for example, two spot colors #1 and #2 are added to the four process colors, then the total number of colors to be processed becomes six. In that regard, for example, assume that two stations 60 are used and each station 60 has the four printing units 51a to 51d. In the first station 60, it is assumed that printing of the cyan (C) color, the magenta (M) color, the yellow (Y) color, and the black (K) color is performed using the data control units 30a to 30d and using the printing units 51a to 51d. In contrast, in the second station 60, it is assumed that printing of only the spot colors #1 and #2 is performed.

In this case, it is thinkable to have a configuration in which the second station 60 includes two data control units 30 for respectively processing the print image data of the spot color #1 and the print image data of the spot color #2. Because of that, the number of data control units 30 used in the first station 60 is different than the number of data control units 30 used in the second station 60. As a result, the control information regarding each data control unit 30 or the print control performed among the data control units 30 becomes complex.

Alternatively, the second station 60 can be configured in an identical manner to the first station 60 that includes the four data control units 30a to 30d and the four printing units 51a to 51b; and can be configured to make use of only two data control units 30a and 30b and only two printing units 51a and 51b. However, in such a configuration of the second station 60, the data control units 30c and 30d as well as the printing units 51c and 51d become useless.

Still alternatively, it is thinkable to have a configuration in which six stations 60 each performing printing of a single color are disposed and a common control is performed across the stations 60 with the aim of eliminating redundant components in any of the stations 60. However, in this configuration, the use of six stations 60 results in an enormous increase in the manufacturing cost.

In that regard, in the second configuration according to the embodiment, the printer engine 15 includes three stations 60 each including four data printing units 51a to 51d and including two data control units 30a and 30c. Regarding the printing of colors including the spot colors, each station 60 performs printing of two colors. With such a configuration, it becomes possible to have the same configuration for each station 60 and it becomes possible to commonalize the operations with respect to the data control units 30a and 30c.

Figure 17:
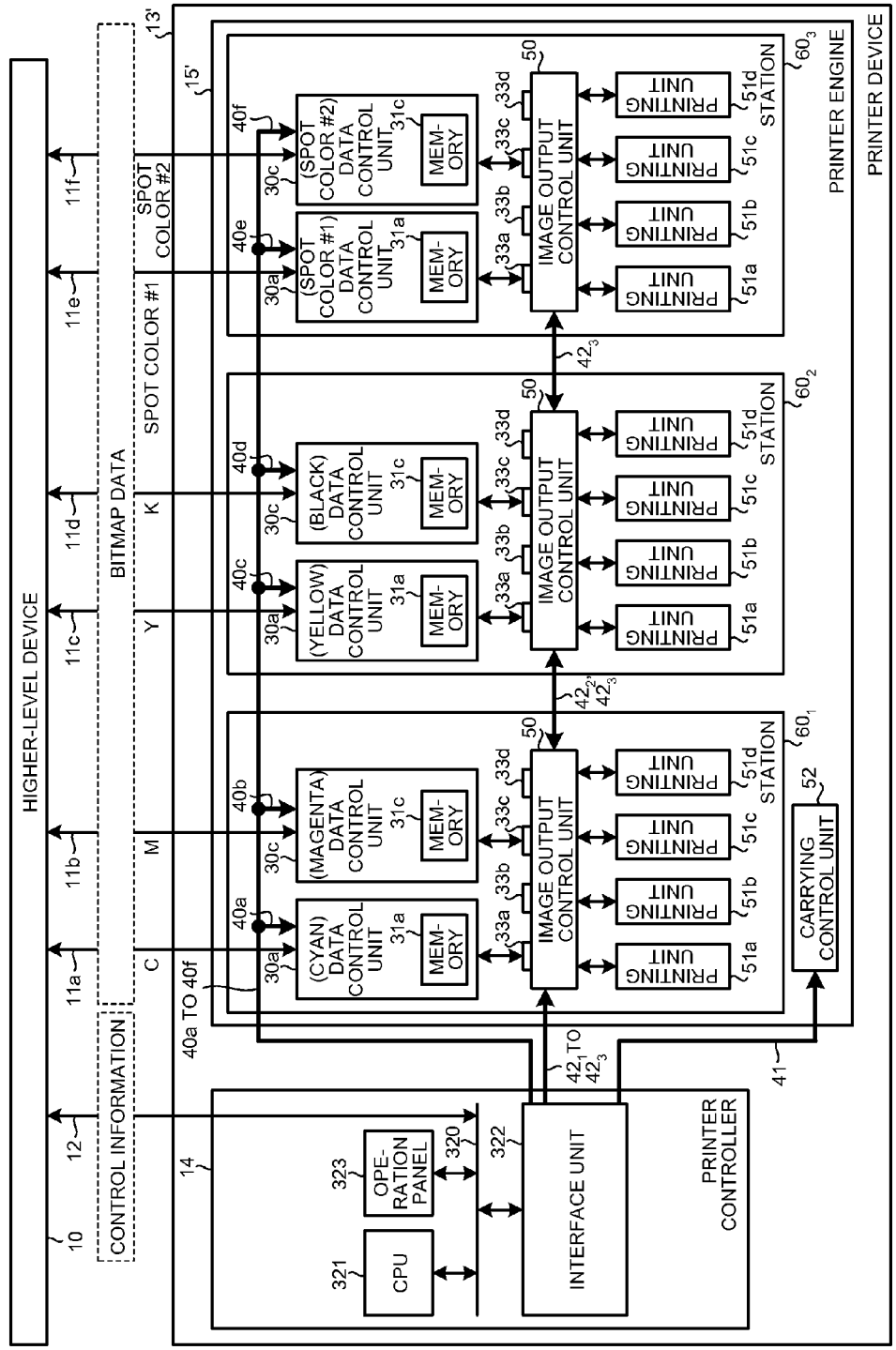
FIG. 17 is a block diagram illustrating an exemplary configuration of a printer device in a second configuration according to the embodiment.

FIG. 17 is a block diagram illustrating an exemplary configuration of a printer device 13' according to the second configuration. In FIG. 17, the constituent elements identical to the constituent elements illustrated in FIG. 3 are referred to by the same reference numerals, and the detailed explanation thereof is not repeated.

As illustrated in FIG. 17, in the printer device 13', a printer engine 15' includes three stations $60_1$, $60_2$, and $60_3$ each of which includes four printing units 51a to 51d and has two data control units 30a and 30c connected thereto. Moreover, in each of the stations $60_1$, $60_2$, and $60_3$; the data control units 30a and 30c are respectively connected to the connecting units 33a and 33c from among the four connecting units 33a to 33d.

The printer controller 14 is connected to the data control units 30a and 30c in each of the stations $60_1$, $60_2$, and $60_3$ via engine I/F control lines 40a to 40f. Moreover, the printer controller 14 is connected to the image output control unit 50 in the stations $60_1$, $60_2$, and $60_3$ via communication lines $42_1$, $42_2$, and $42_3$, respectively.

In the station $60_1$, the data control units 30a and 30c respectively process the print image data of the cyan (C) color and the print image data of the magenta (M) color. Moreover, the printing units 51a and 51b perform printing of the cyan (C) color, while the printing units 51c and 51d perform printing of the magenta (M) color. In the station $60_2$, the data control units 30a and 30c respectively process the print image data of the yellow (Y) color and the print image data of the black (K) color. Moreover, the printing units 51a and 51b perform printing of the yellow (Y) color, while the printing units 51c and 51d perform printing of the black (K) color. In the station $60_3$, the data control units 30a and 30c respectively process the print image data in the spot color #1 and the print image data in the spot color #2. Moreover, the printing units 51a and 51b perform printing of the spot color #1, while the printing units 51c and 51d perform printing of the spot color #2.

The higher-level device 10 performs RIP processing according to the print job data received from the host device 5, and generates bitmap data of each of the process colors of cyan (C), magenta (M), yellow (Y), and black (K) as well as generates bitmap data of each of the spot color #1 and the spot color #2. Then, the higher-level device 10 writes each set of bitmap data in the RAM 103.

Subsequently, the CPU 101 performs compression coding of the bitmap data of each color that is written in the RAM 103, and temporarily stores the compression-coded bitmap data in the HDD 104.

At the time when, for example, a printing operation is started in the printer device 13'; the CPU 101 reads the compression-coded bitmap data of each color from the HDD 104, decodes that bitmap data, and writes the expanded bitmap data of each color including the spot colors #1 and #2 in the RAM 103. Then, the CPU 101 reads the bitmap data of each color from the RAM 103, and outputs the bitmap data of each color as the print image data of each color from the channels of the print image data I/F 112.

The print image data of cyan (C), magenta (M), yellow (Y), and black (K) colors as well as the print image data of the spot colors #1 and #2 that is output from the channels of the print image data I/F 112 is provided to the printer device 13' via data lines 11a to 11f, respectively. In the printer device 13', the data lines 11a and 11b are respectively connected to the data control units 30a and 30c of the station $60_1$; the data lines 11c and 11d are respectively connected to the data control units 30a and 30c of the station $60_2$; and the data lines 11e and 11f are respectively connected to the data control units 30a and 30c of the station $60_3$.

FIG. 18 illustrates an example of a table of setting information for the data control unit according to the second configuration. The items in this table of the setting information for the data control unit are identical to the items in the table of the setting information for the data control unit illustrated in FIG. 10 according to the first configuration.

Among the common items, the common item "number of stations" has the value "3" set therein; and the common item "station location number" has one of the values "1", "2", and "3" set therein. Moreover, the common item "number of data control units per station" has the value "2" set therein. Thus, as illustrated in FIG. 17, the three stations $60_1$, $60_2$, and $60_3$ are assumed to have the location numbers of "1", "2", and "3", respectively. Moreover, each of the three stations $60_1$, $60_2$, and $60_3$ has the two data control units 30a and 30c connected thereto.

Meanwhile, in a data-control-unit peculiar item, identification information of a data control unit and the color processed by the data color unit having that identification information are held in a corresponding manner. In the example illustrated in FIG. 18, it is defined that the data control unit having identification information "1" processes the cyan (C) color; the data control unit having identification information "2" processes the magenta (M) color; the data control unit having identification information "3" processes the yellow (Y) color; and the data control unit having identification information "4" processes the black (K) color. Moreover, in the second configuration, since the printing of the spot colors #1 and #2 is also performed; identification information "5" and identification information "6" is also defined. Then, it is defined that the data control unit having the identification information "5" processes the spot color #1 and the data control unit having the identification information "6" processes the spot color #2.

Furthermore, in the example illustrated in FIG. 18, the common item "number of data control units per station" has the value "2" set therein according to the value set in the common item "number of stations". Thus, of the data control units having the identification information "1" to the identification information "6"; it is defined that, for example, the station having the location number "1" includes the data control units having the identification information "1" and "2"; the station having the location number "2" includes the data control units having the identification information "3" and "4"; and the station having the location number "3" includes the data control units having the identification information "5" and "6".

More particularly, the data control units having the identification information "1" and "2" are considered to be the data control units 30a and 30c, respectively, in the station $60_1$; and are considered to process the print image data of the cyan (C) color and the print image data of the magenta (M) color, respectively. Similarly, the data control units having the identification information "3" and "4" are considered to be the data control units 30a and 30c, respectively, in the station $60_2$; and are considered to process the print image data of the yellow (Y) color and the print image data of the black (K) color, respectively. Moreover, the data control units having the identification information "5" and "6" are considered to be the data control units 30a and 30c, respectively, in the station $60_3$; and are considered to process the print image data of the spot color #1 and the print image data of the spot color #2, respectively.

FIGS. 19A to 19C illustrate examples of a table of the setting information for the image output control unit according to the second configuration. The items in each table of the setting information for the image output control unit are identical to the items in the table of the setting information for the image output control unit illustrated in FIG. 11 according to the first configuration.

FIG. 19A illustrates an example of a table of the setting information for the image output control unit corresponding to the station for which the common item "station location number" is set to "1". A common item "number of used input I/F controllers" has the value "2" set therein and the common item "station location number" has the value "1" set therein. In image-output-control-unit peculiar items, the cyan (C) color is assigned to the printing units #1 and #2; and the magenta (M) color is assigned to the printing units #3 and #4. More particularly, in the station $60_1$ for which the common item "station location number" is set to "1", it is defined that the cyan (C) color is assigned to the printing units 51a and 51b; and it is defined that the magenta (M) color is assigned to the printing units 51c and 51d.

FIG. 19B illustrates an example of a table of the setting information for the image output control unit corresponding to the station for which the common item "station location number" is set to "2". The common item "number of used input I/F controllers" has the value "2" set therein and the common item "station location number" has the value "2" set therein. In image-output-control-unit peculiar items, the yellow (Y) color is assigned to the printing units #1 and #2; and the black (K) color is assigned to the printing units #3 and #4. More particularly, in the station $60_2$ for which the common item "station location number" is set to "2", it is defined that the yellow (Y) color is assigned to the printing units 51a and 51b; and it is defined that the black (K) color is assigned to the printing units 51c and 51d.

FIG. 19C illustrates an example of a table of the setting information for the image output control unit corresponding to the station for which the common item "station location number" is set to "3". The common item "number of used input I/F controllers" has the value "2" set therein and the common item "station location number" has the value "3" set therein. In image-output-control-unit peculiar items, the spot color #1 is assigned to the printing units #1 and #2; and the spot color #2 is assigned to the printing units #3 and #4. More particularly, in the station $60_3$ for which the common item "station location number" is set to "3", it is defined that the spot color #1 is assigned to the printing units 51a and 51b; and it is defined that the spot color #2 is assigned to the printing units 51c and 51d.

For example, at the time of starting the printer device 13'; the printer controller 14 sends the tables of the setting information for the image output control unit to the image output control unit 50 in the stations $60_1$, $60_2$, and $60_3$ via the communication lines $42_1$, $42_2$, and $42_3$, respectively. Then, the table of the setting information for the image output control unit received by the image output control unit 50 in each of the stations $60_1$, $60_2$, and $60_3$ is provided to the corresponding path switching controller 312. In each path switching controller 312, the path information is set in the path switching unit 334 on the basis of the corresponding table of the setting information for the image output control unit. Subsequently, each path switching controller 312 selects paths for the print image data of the corresponding colors on the basis of the path information.

Along with that, the printer controller 14 sends the table of the setting information for the data control unit to the data control units 30a and 30c in each of the stations $60_1$, $60_2$, and $60_3$ via the engine I/F control lines 40a to 40f. Based on the identification information in the table of the setting information for the data control unit that is received, each of the data control units 30a and 30c in each of the stations $60_1$, $60_2$, and $60_3$ identifies the table of the setting information for the data control unit corresponding thereto and determines the color of the print image data to be processed.

Figure 20:
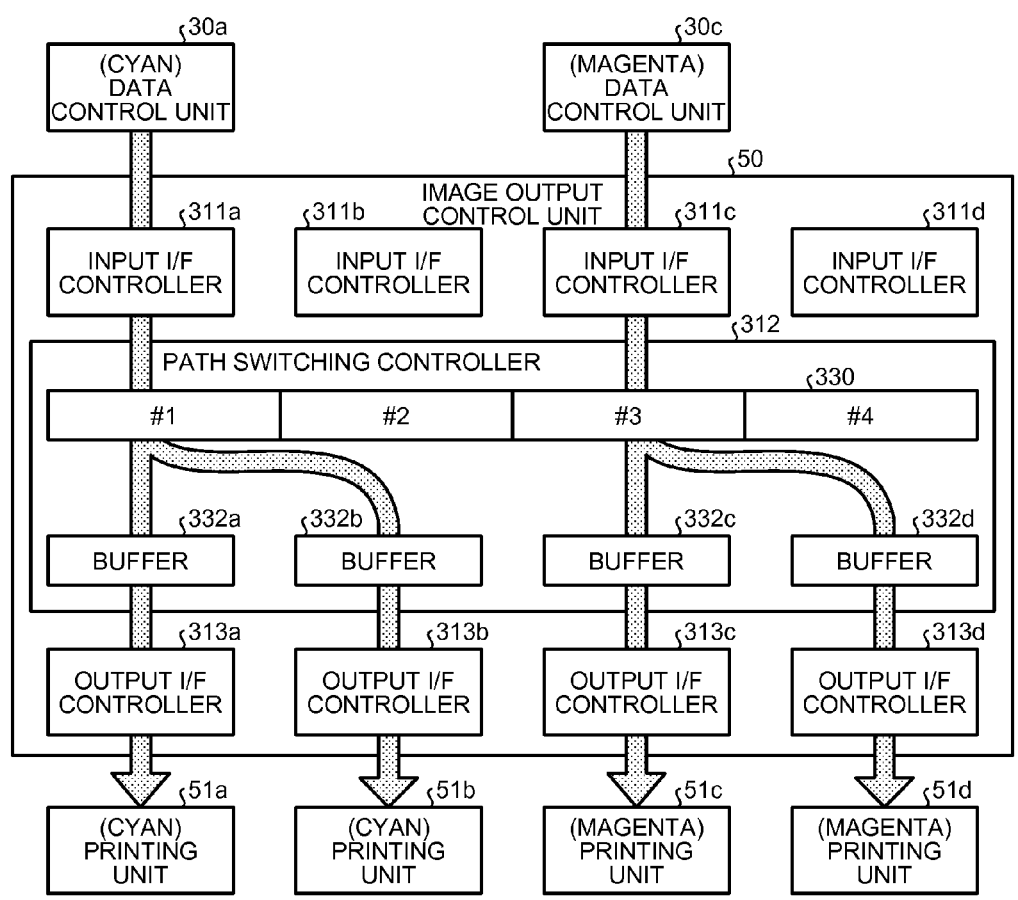
FIG. 20 is an outlined line drawing schematically illustrating flows of print image data from data control units to printing units in the second configuration according to the embodiment.

FIG. 20 is an outlined line drawing schematically illustrating flows of the print image data from the data control units 30a and 30c to the printing units 51a to 51d in the station $60_1$ illustrated in FIG. 17 according to the second configuration. In FIG. 20, the constituent elements identical to the constituent elements illustrated in FIGS. 6, 7, and 17 are referred to by the same reference numerals, and the detailed explanation thereof is not repeated.

In the second configuration, as described above, the printer engine 15' includes the three stations $60_1$, $60_2$, and $60_3$. In the station $60_1$, the printing units 51a to 51d perform printing on the print sheet 201 based on the print image data of the cyan (C) color and the print image data of the magenta (M) color transferred from the higher-level device 10. In the station $60_2$, the printing units 51a to 51d perform printing on the print sheet 201 based on the print image data of the yellow (Y) color and the print image data of the black (K) color transferred from the higher-level device 10. In the station $60_3$, the printing units 51a to 51d perform printing on the print sheet 201 based on the print image data of the spot color #1 and the print image data of the spot color #2 transferred from the higher-level device 10.

Meanwhile, except for the difference in the colors processed by the stations $60_1$, $60_2$, and $60_3$; the operations performed by them are identical. Hence, the following explanation is given only with reference to the station $60_1$.

The print image data of the cyan (C) color and the print image data of the magenta (M) color is transferred from the higher-level device 10 to the data control units 30a and 30c, respectively; and is input to the input I/F controllers 311a and 311c, respectively. Then, the print image data of the cyan (C) color and the print image data of the magenta (M) color that is input to the input I/F controllers 311a and 311c, respectively, is stored in the areas #1 and #3 of the buffer 330, respectively, of the path switching controller 312.

Herein, according to the path information set in the path switching unit 334; the path switching controller 312 can recognize that the printing of the print image data of the cyan (C) color is to be performed by the two printing units 51a and 51b, and can recognize that the printing of the print image data of the magenta (M) color is to be performed by the two printing units 51c and 51d. Accordingly, the path switching unit 334 controls the data distribution control unit 331 and stores the print image data of the cyan (C) color, which is read from the area #1 of the buffer 330, in the buffers 332a and 332b. In an identical manner, the path switching unit 334 controls the data distribution control unit 331 and stores the print image data of the magenta (M) color, which is read from the area #3 of the buffer 330, in the buffers 332c and 332d. At that time, it is desirable if the print image data of the cyan (C) color is rearranged in the order suitable for high-speed printing and then stored in the buffers 332a and 332b. Similarly, it is desirable that the print image data of the magenta (M) color is rearranged in the order suitable for high-speed printing and then stored in the buffers 332c and 332d.

The path switching controller 312 measures a printing timing on the basis of the count of the counter 335, which performs counting by considering the initial print position instruction sent from the printer controller 14 in synchronization with paper carrying as the trigger. When the printing timing is reached, the path switching controller 312 reads the print image data of the cyan (C) color from the buffers 332a and 332b. Then, the print image data of the cyan (C) color that is read is input to the output I/F controllers 313a and 313b, and is provided to the printing units 51a and 51b for printing purposes.

In an identical manner, at the printing timing, the path switching controller 312 reads the print image data of the magenta (M) color from the buffers 332c and 332d. Then, the print image data of the magenta (M) color that is read is input to the output I/F controllers 313c and 313d, and is provided to the printing units 51c and 51d for printing purposes.

In this way, according to the second configuration, the printing of the cyan (C) color, the magenta (M) color, the yellow (Y) color, the black (K) color, the spot color #1, and the spot color #2 is performed using the three stations $60_1$, $60_2$, and $60_3$ each of which has two data control units 30a and 30c connected thereto. For that reason, it becomes possible to commonalize the print control with respect to the stations $60_1$, $60_2$, and $60_3$. Moreover, a configuration not including the station $60_3$ can also be achieved with great ease. Hence, it becomes possible to deal with a case when the spot colors #1 and #2 are not to be used.

Furthermore, the printer controller 14 can automatically recognize the configurations of the stations $60_1$, $60_2$, and $60_3$ by means of the obtaining operation performed by the obtaining unit 326. As a result, it becomes possible to commonalize the station 60 according to the first configuration with the stations $60_1$, $60_2$, and $60_3$ according to the second configuration.

Herein, in each of the stations $60_1$, $60_2$, and $60_3$; in order to perform printing of the print image data of a single color using a plurality of printing units such as the printing units 51a and 51b, the path switching controller 312 appropriately rearranges the print image data that is read from the buffer 330 and then transfers the print image data in the rearranged form to the buffers 332a and 332b.

Figure 21:
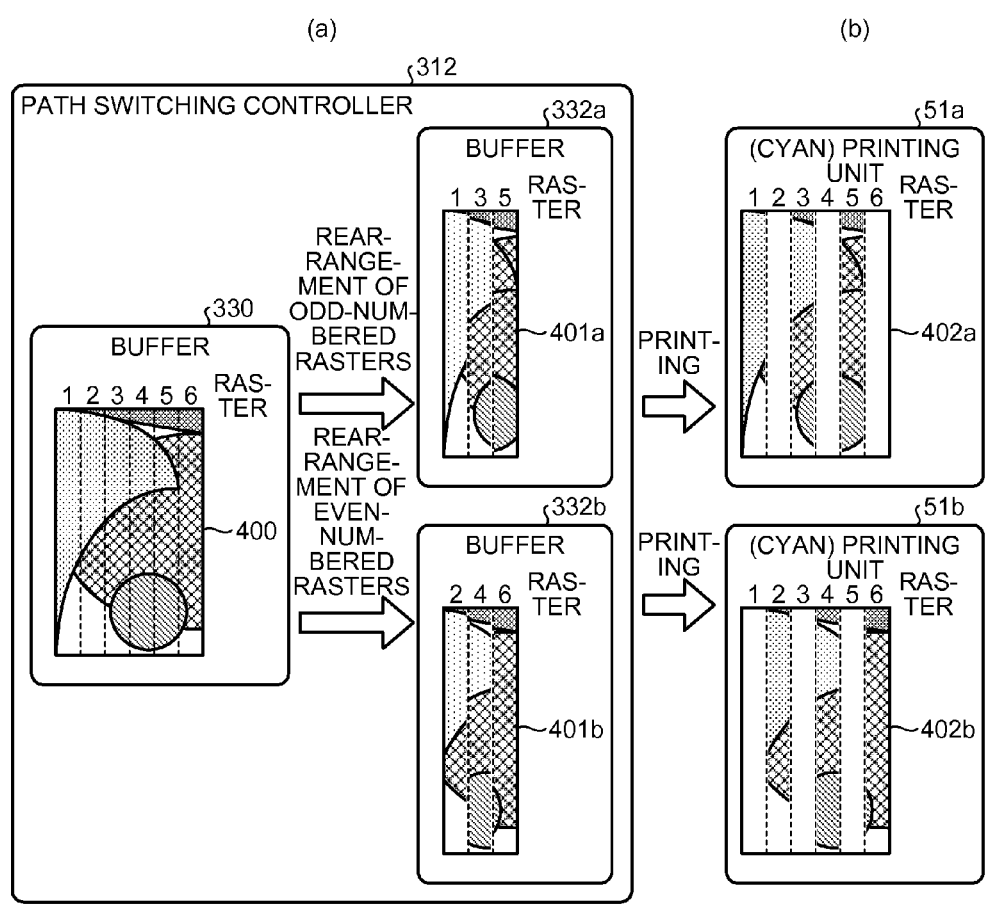
FIG. 21 is an outlined line drawing schematically illustrating an example of rearrangement of print image data according to the embodiment.

FIG. 21 schematically illustrates an example of rearrangement of the print image data performed by the path switching controller 312. Herein, the explanation is given for a case in which the printing units 51a and 51b in the station $60_1$ perform printing. The path switching controller 312 reads the print image data, which is stored in the buffer 330, in units of rasters (units of lines) and in the sets of even-numbered rasters and odd-numbered rasters; and transfers each set of data to the buffers 332a and 332b.

That is, as illustrated in section (a) in FIG. 21, print image data 400 is stored in units of rasters in, for example, the area #1 of the buffer 330. The addresses of the print image data 400 in the area #1 of the buffer 330 is managed by the address managing unit 333. In the path switching controller 312, the data distribution control unit 331 refers to the address information managed by the address managing unit 333 and, of the print image data 400 that is made of raster data #1, raster data #2, and so on stored in the area #1 of the buffer 330, selectively reads the odd-numbered raster data (the raster data #1, the raster data #3, and so on) and stores it in the buffer 332a in units of rasters (as print image data 401a).

In an identical manner, in the path switching controller 312, the data distribution control unit 331 refers to the address information managed by the address managing unit 333; selectively reads the even-numbered raster data (the raster data #2, the raster data #4, and so on); and stores it in the buffer 332b in units of rasters (as print image data 401b). The addresses of the print image data 401a stored in the buffer 332a and the addresses of the print image data 401b stored in the buffer 332b are managed by the address managing unit 333.

The following explanation is given regarding the operations performed in a case when the print image data stored in the buffers 332a and 332b is read and provided to the printing units 51a and 51b, respectively. As illustrated in section (b) in FIG. 21, the odd-numbered raster data stored in the buffer 332a and the even-numbered raster data stored in the buffer 332b are read at alternate timings in units of rasters, and are respectively transferred to the printing units 51a and 51b, respectively.

Then, as explained with reference to FIG. 5, the printing units 51a and 51b are configured to perform printing in units of lines (units of rasters) using the nozzle arrays 511 of each nozzle block 510. For that reason, as illustrated in section (b) in FIG. 21, the odd-numbered raster data stored as print image data 402a in the buffer 332a and the even-numbered raster data stored as print image data 402b in the buffer 332b are transferred to the printing units 51a and 51b, respectively, in units of rasters and in an alternate manner by shifting the timings. As a result, it becomes possible to obtain a printing result in which the raster data #1, the raster data #2, and so on is arranged in units of rasters in an identical manner to the print image data 400 illustrated in section (a) in FIG. 21.

Printing Sequence

Given below is the explanation of a printing operation performed in the second configuration according to the embodiment. FIG. 22 is a sequence diagram for explaining, on a conceptual basis, an exemplary printing operation performed in the second configuration. Herein, it is assumed that printing is performed using the processing colors of cyan (C), magenta (M), yellow (Y), and black (K) as well as using the spot colors #1 and #2.

The printer controller 14 receives, as control information, the information related to the print sheet 201 from the higher-level device 10 (SEQ 200), and accordingly sets the paper feeding length with respect to the carrying control unit 52 (SEQ 203). From the higher-level device 10, the printer controller 14 receives control information indicating a job start notice with respect to the first page (page #1) (SEQ 201), and issues requests to the data control units 30a and 30c in each of the stations $60_1$, $60_2$, and $60_3$ to start data transfer regarding the cyan (C) color, the magenta (M) color, the yellow (Y) color, the black (K) color, the spot color #1, and the spot color #2 in the first page (SEQ 210a to SEQ 210f).

In the station $60_1$, according to the requests issued at SEQ 210a and SEQ 210b, the data control units 30a and 30c issue a request for the print image data of the cyan (C) color in the first page and the print image data of the magenta (M) color in the first page, respectively, to the higher-level device 10 via the data lines 11a and 11b, respectively. Then, the print image data of the cyan (C) color in the first page and the print image data of the magenta (M) color in the first page, which is transferred from the higher-level device 10 in response to the requests, is stored in the memories 31a and 31c by the data control units 30a and 30c, respectively.

In an identical manner, in the station $60_2$, according to the requests issued at SEQ 210c and SEQ 210d, the data control units 30a and 30c issue a request for the print image data of the yellow (Y) color in the first page and the print image data of the black (K) color in the first page, respectively, to the higher-level device 10 via the data lines 11c and 11d, respectively. Then, the print image data of the yellow (Y) color in the first page and the print image data of the black (K) color in the first page, which is transferred from the higher-level device 10 in response to the requests, is stored in the memories 31a and 31c by the data control units 30a and 30c, respectively. In an identical manner, in the station $60_3$, according to the requests issued at SEQ 210e and SEQ 210f, the data control units 30a and 30c issue a request for the print image data of the spot color #1 in the first page and the print image data of the spot color #2 in the first page, respectively, to the higher-level device 10 via the data lines 11e and 11f, respectively. Then, the print image data of the spot color #1 in the first page and the print image data of the spot color #2 in the first page, which is transferred from the higher-level device 10 in response to the requests, is stored in the memories 31a and 31c by the data control units 30a and 30c, respectively.

Meanwhile, in the example illustrated in FIG. 22, while the printer controller 14 is issuing requests to the data control units 30a and 30c in each of the stations $60_1$, $60_2$, and $60_3$ to start data transfer of data in the first page, the printer controller 14 receives control information, which indicates a job start notice with respect to the second page, from the higher-level device 10 (SEQ 202).

Once the print image data of all colors in the first page is completely transferred from the higher-level device 10; then the data control units 30a and 30c in each of the stations $60_1$, $60_2$, and $60_3$ notify the printer controller 14 about the completion of data transfer (SEQ 211a to SEQ 211f). In response to each of those notifications, the printer controller 14 issues requests to the data control units 30a and 30c in each of the stations $60_1$, $60_2$, and $60_3$ to start data transfer of the second page (page #2) (SEQ 212a to SEQ 212f).

In response to the requests, the data control units 30a and 30c in each of the stations $60_1$, $60_2$, and $60_3$ issue requests to the higher-level device 10 for the print image data of the respective colors in the second page. Then, in each of the stations $60_1$, $60_2$, and $60_3$; the data control units 30a and 30c store the print image data of the respective colors in the second page, which is transferred from the higher-level device 10 in response to the requests, in the memories 31a and 31c, respectively.

Meanwhile, when the printer controller 14 receives notifications from the data control units 30a and 30c in each of the stations $60_1$, $60_2$, and $60_3$ about the completion of data transfer of the first page, the printer controller 14 issues a paper carrying start request to the carrying control unit 52 (SEQ 213). In response to the paper carrying start request, the carrying control unit 52 starts carrying the print sheet 201 at a predetermined speed. Along with issuing a paper carrying start request to the carrying control unit 52, the printer controller 14 instructs the data control units 30a and 30c in each of the stations $60_1$, $60_2$, and $60_3$ to start printing of the first page (SEQ 214).

When the print sheet 201 reaches, for example, a predetermined position; the carrying control unit 52 informs the printer controller 14 that the print sheet 201 is in a printable state (SEQ 217). In response to the printable state report received from the carrying control unit 52, the printer controller 14 instructs the initial print position to the data control units 30a and 30c in each of the stations $60_1$, $60_2$, and $60_3$ (SEQ 218).

According to the initial print position instruction, each of the data control units 30a and 30c in each of the stations $60_1$, $60_2$, and $60_3$ start the printing. For example, in each of the stations $60_1$, $60_2$, and $60_3$; with the reception of the initial print position instruction as the trigger, the counter 335 of the path switching controller 312 starts counting a raster count. In the station $60_1$, when the count of the counter 335 reaches a predetermined value; firstly, from the memory 31a, the data control unit 30a starts reading the print image data of the cyan (C) color in the first page.

Then, in the station $60_1$, the print image data of the cyan (C) color that is read from the memory 31a is then transferred to the image output control unit 50 and stored in, for example, the area #1 of the buffer 330. Then, as explained with reference to section (a) in FIG. 21, of the raster data read from the area #1 of the buffer 330, the odd-numbered raster data is stored in the buffer 332a and the even-numbered raster data is stored in the buffer 332b.

Subsequently, as explained with reference to section (b) in FIG. 21, the odd-numbered raster data stored in the buffer 332a and the even-numbered raster data stored in the buffer 332b is read at alternate timings in units of rasters, and is respectively transferred to the printing units 51a and 51b. Then, the printing units 51a and 51b perform alternate printing of the odd-numbered raster data and the even-numbered raster data in units of rasters (SEQ 219a). Once the printing of the print image data of the cyan (C) color in the first page is completed, the printer controller 14 is notified about the same (SEQ 220a).

In an identical manner, in the data control unit 30c and the printing unit 51c of the station $60_2$, when the count of the counter 335 reaches a predetermined value, the printing is performed; and, regarding the print image data of the magenta (M) color, the odd-numbered raster data and the even-numbered raster data is alternately printed by the printing units 51c and 51d (SEQ 219b). Once the printing of the print image data of the magenta (M) color in the first page is completed, the printer controller 14 is notified about the same (SEQ 220b). Meanwhile, when the count of the counter 335 becomes equivalent to the length of a single page, the count is reset and raster counting is restarted.

Regarding the stations $60_2$ and $60_3$ too, when the count of the respective counters 335 reaches a predetermined value, the printing is performed; and the odd-numbered raster data and the even-numbered raster data of each of the print image data of the yellow (Y) color, the print image data of the black (K) color, the print image data of the spot color #1, and the print image data of the spot color #2 is alternately printed using the data control units 30a and 30c as well as the printing units 51a to 51d (SEQ 219c to SEQ 219f). Once the printing of the print image data of each color in the first page is completed, the printer controller 14 is notified about the same (SEQ 220c to SEQ 220f).

Meanwhile, when the data transfer of the print image data of each color in the second page, which is started at SEQ 212a to SEQ 212f, is completed; the data control units 30a and 30c in each of the stations $60_1$, $60_2$, and $60_3$ notify the printer controller 14 about the same (SEQ 215). In response to the notifications about the completion of the data transfer, the printer controller 14 instructs the data control units 30a and 30c in each of the stations $60_1$, $60_2$, and $60_3$ to start performing printing of the second page (SEQ 216).

When the printing of the first page is completed and when the count of the counter 335 reaches a predetermined value after being reset, the data control units 30a and 30c in each of the stations $60_1$, $60_2$, and $60_3$ start the printing of the second page.

For example, in the station $60_1$, after the printing of the print image data of the cyan (C) color in the first page (SEQ 220a) is completed; when the count of the counter 335 reaches a predetermined value, the data control unit 30a reads the print image data of the cyan (C) color in the second page from the memory 31a and transfers that data to the image output control unit 50 for the purpose of starting the printing on the print sheet 201 (SEQ 221a). Once the printing of the print image data of the cyan (C) color is completed, the printer controller 14 is notified about the same (SEQ 222a).

In an identical manner, in the station $60_2$, after the printing of the print image data of the magenta (M) color in the first page (SEQ 220b) is completed; when the count of the counter 335 reaches a predetermined value, the data control unit 30c reads the print image data of the magenta (M) color in the second page from the memory 31c and transfers that data to the image output control unit 50 for the purpose of starting the printing on the print sheet 201 (SEQ 221b). Once the printing of the print image data of the magenta (M) color is completed, the printer controller 14 is notified about the same (SEQ 222b).

In each of the stations $60_2$ and $60_3$ too, in an identical manner, when the count of the counter 335 reaches a predetermined value, the data control units 30a and 30c read the print image data of the yellow (Y) color, the black (K) color, the spot color #1, and the spot color #2 from the memories 31a and 31c. Then, in each of the stations $60_2$ and $60_3$, the print image data of each color is provided to the printing units 51a to 51d and the printing of each color in the second page on the print sheet 201 is started in a predetermined manner (SEQ 221c to SEQ 221f). Once the printing of the print image data of each color in the second page is completed, the printer controller 14 is notified about the same (SEQ 222c to SEQ 222f).

Once a notification about the completion of printing of the second color #2 on the second page is received from the data control unit 30c in the station $60_3$, the printer controller 14 assumes that the last page in the print job has been printed and thus issues a request to the carrying control unit 52 to stop carrying the print sheet 201 (SEQ 223). In response to that request, the carrying control unit 52 stops carrying the print sheet 201 and notifies the printer controller 14 about the same (SEQ 224). That marks the end of the sequence of printing operations.

As described above, according to the embodiment, with respect to a station that includes the image output control unit 50 having the connecting units 33a to 33d and that includes the printing units 51a to 51d; the data control units 30 having a required configuration can be connected. For example, the station 60 according to the first configuration can be configured by connecting the data control units 30a to 30d to the connecting units 33a to 33d, respectively. Alternatively, each of the stations $60_1$, $60_2$, and $60_3$ according to the second configuration can be configured by connecting the corresponding data control units 30a and 30c to the connecting units 33a and 33c, respectively. With such configurations, it becomes possible to cut down on the manufacturing cost.

Moreover, in the printer controller 14, the obtaining unit 326 automatically detects the configuration of each station. Then, based on the detection result of the obtaining unit 326, the table creating unit 325 creates a table of setting information for each data control unit as well as creates a table of setting information for the image output control unit 50; and sends the table of the setting information for the data control unit to the data control units 30 and sends the table of the setting information for the image output control unit to the image output control unit 50. For that reason, in each station, it becomes possible to select the paths of print image data according to the configuration of that station.

Thus, according to an aspect of the invention, in a printing system in which a higher-level device transfers print image data to a printing device, it becomes possible to deal with different variations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device comprising:
   printing units each associated with a color, the print units configured to print an image using image data generated by a higher-level device, the printing units having a plurality of nozzle blocks arranged in even and odd rows;
   an image output controller including input interface (I/F) controllers and a path switching controller, the input I/F controllers configured to receive the image data and the path switching controller including first and second buffers and a data distribution controller therebetween, the data distribution controller configured to,
      read the image data in units of rasters from the first buffers,
      rearrange the read image data based on setting information such that, for each of the colors, the image data associated with the even rows of nozzle blocks are grouped together and the image data associated with the odd rows of nozzle blocks are grouped together, and
      transfer the rearranged image data to the second buffers;
   at least one data controller associated with each of the colors, the at least one data controller configured to detachably connect to the image output controller via connecting units connected to the input I/F controllers in a configuration, the at least one data controller configured to transfer the image data from a higher level device to the image output controller; and
   a printer controller configured to,
      detect the configuration of the at least one data controller,
      generate the setting information based on the detected configuration of the at least one data controller, the setting information indicating at least a number of the at least one data controller, which of the at least one data controller is associated with which colors, and a number of the input I/F controllers connected to the at least one data controller that are configured to receive the image data in the configuration, and
      provide the generated setting information to the at least one data controller and the image output controller.

2. The printing device according to claim 1, wherein the printer controller includes,
   an obtaining unit configured to,
      detect connection of the at least one data controller to the input I/F controllers, and
      obtain the number of the at least one data controller for which connection is detected,
      obtain the positions of the input I/F controllers to which the at least one data controller are connected, and
      obtain identification information of each of the at least one data controller;
   a creating unit configured to, based on the number of the at least one data controller, the positions of the input I/F controllers, and the identification information, create the setting information that indicates target printing units, from among the printing units, for sending the image data held in the at least one data controller identified by the identification information to the image output controller; and
   a sending unit that sends the setting information to the path switching controller.

3. The printing device according to claim 1, wherein each of a plurality of the printing units is configured to perform printing of one of process colors and spot colors.

4. A control method of a printing device, the control method comprising:
   printing, by printing units associated with colors, an image using image data generated by a higher-level device, the printing units having a plurality of nozzle blocks arranged in even and odd rows;
   transferring, by data controllers associated with each of the colors, image data from a higher level device to first buffers of a path switching controller included in an input an image output controller, the data controllers configured to detachably connect to the image output controller via connecting units connected to input interface (I/F) controllers of the image output controller in a configuration; and
   reading, by the path switching controller, the image data in units of rasters from the first buffers included therein;
   rearranging, by the path switching controller, the read image data based on setting information such that, for each of the colors, the image data associated with the even rows of nozzle blocks are grouped together and the image data associated with the odd rows of nozzle blocks are grouped together;
   transferring, by the path switching controller, the rearranged image data to second buffers therein; and
   controlling, by a printer control unit, the printing of the image data by,
      detecting, by the printer controller, the configuration of the data controllers;
      generating the setting information based on the detected configuration of the data controllers, the setting information indicating at least a number of the data controllers, which of the data controllers are associated with which colors, and a number of the input I/F controllers connected to the data controllers that are configured to receive the image data in the configuration, and
      providing the generated setting information to the data controllers and the image output controller.

* * * * *